United States Patent
Sato et al.

(10) Patent No.: US 8,375,790 B2
(45) Date of Patent: Feb. 19, 2013

(54) PHYSICAL QUANTITY DETECTION APPARATUS, METHOD OF CONTROLLING PHYSICAL QUANTITY DETECTION APPARATUS, ABNORMALITY DIAGNOSIS SYSTEM, AND ABNORMALITY DIAGNOSIS METHOD

(75) Inventors: Kenji Sato, Matsumoto (JP); Yutaka Takada, Minami-minowa-mura (JP); Hideto Naruse, Okaya (JP); Masayuki Takahashi, Nasushiobara (JP)

(73) Assignees: Epson Toyocom Corporation, Tokyo (JP); Seiko NPC Corporation, Tokyo (JP); Seiko Epson Corporation, Tokyo (JP)

( * ) Notice: Subject to any disclaimer, the term of this patent is extended or adjusted under 35 U.S.C. 154(b) by 296 days.

(21) Appl. No.: 12/797,113

(22) Filed: Jun. 9, 2010

(65) Prior Publication Data

US 2010/0326189 A1    Dec. 30, 2010

(30) Foreign Application Priority Data

Jun. 12, 2009   (JP) ................................. 2009-140700

(51) Int. Cl.
*G01C 19/56* (2006.01)
(52) U.S. Cl. .................. 73/504.12; 73/504.16
(58) Field of Classification Search ............... 73/504.12, 73/504.16, 504.04, 504.15, 504.14, 1.37, 73/1.38, 1.77
See application file for complete search history.

(56) References Cited

U.S. PATENT DOCUMENTS

| | | | |
|---|---|---|---|
| 5,939,630 A * | 8/1999 | Nozoe et al. ............... | 73/504.16 |
| 6,167,744 B1 | 1/2001 | Akimoto et al. | |
| 6,282,957 B1 | 9/2001 | Akimoto et al. | |
| 6,418,790 B1 * | 7/2002 | Yukawa et al. ............ | 73/504.12 |
| 6,467,347 B1 * | 10/2002 | Fujimoto .................... | 73/504.12 |
| 6,588,274 B1 | 7/2003 | Kumada et al. | |
| 7,069,783 B2 * | 7/2006 | Uehara ....................... | 73/514.12 |
| 7,322,237 B2 * | 1/2008 | Kutsuna .................... | 73/504.12 |
| 7,779,688 B2 * | 8/2010 | Sato et al. .................. | 73/504.12 |
| 7,814,792 B2 * | 10/2010 | Tateyama et al. .......... | 73/504.12 |
| 8,171,792 B2 * | 5/2012 | Sameshima ............... | 73/504.04 |

FOREIGN PATENT DOCUMENTS

| | | |
|---|---|---|
| JP | A-3-226621 | 10/1991 |
| JP | A-2000-146590 | 5/2000 |
| JP | A-2000-171257 | 6/2000 |
| JP | A-2001-304871 | 10/2001 |
| JP | B2-3520821 | 2/2004 |
| WO | WO 2010/050393 A1 | 5/2010 |

* cited by examiner

*Primary Examiner* — Helen C. Kwok
(74) *Attorney, Agent, or Firm* — Oliff & Berridge, PLC

(57) ABSTRACT

An angular velocity detection apparatus (i.e., physical quantity detection apparatus) includes a gyro sensor element (i.e., physical quantity detection element) that allows an angular velocity detection signal that corresponds to the magnitude of an angular velocity (i.e., physical quantity) and a leakage signal of vibrations based on a drive signal (square-wave voltage signal) to flow through a detection electrode, a driver circuit that generates the drive signal, a synchronous detection circuit that performs a synchronous detection process on a detection target signal that includes the angular velocity detection signal and the leakage signal based on a detection signal that is synchronized with the drive signal, and a phase change circuit that changes a relative timing of at least one of a rising edge and a falling edge of the detection signal with respect to the detection target signal based on a control signal so that at least part of the leakage signal is output by the synchronous detection process.

12 Claims, 13 Drawing Sheets

PHYSICAL QUANTITY DETECTION APPARATUS, METHOD OF CONTROLLING PHYSICAL QUANTITY DETECTION APPARATUS, ABNORMALITY DIAGNOSIS SYSTEM, AND ABNORMALITY DIAGNOSIS METHOD

Japanese Patent Application No. 2009-140700, filed on Jun. 12, 2009, is hereby incorporated by reference in its entirety.

BACKGROUND OF THE INVENTION

The present invention relates to a physical quantity detection apparatus, a method of controlling a physical quantity detection apparatus, an abnormality diagnosis system, an abnormality diagnosis method, etc.

A physical quantity detection apparatus that detects a physical quantity has been known. For example, an angular velocity detection apparatus that detects an angular velocity as the physical quantity has been known. An electronic instrument or a system that includes an angular velocity detection apparatus and performs a control process based on the angular velocity detected by the angular velocity detection apparatus has been widely used. For example, a vehicle travel control system prevents a side skid based on the angular velocity detected by the angular velocity detection apparatus.

Such an electronic instrument or system performs wrong control if the angular velocity detection apparatus breaks down. Therefore, measures such as lighting an alarm lamp when the angular velocity detection apparatus has broken down have been employed. Various technologies that diagnose failure of the angular velocity detection apparatus have been proposed. For example, Japanese Patent No. 3520821 discloses a vibrating gyro apparatus that includes a self-diagnosis circuit that superimposes an offset signal on at least one signal output from a detection means of a vibrator to detect an open circuit or a short circuit of the detection means. JP-A-2001-304871 discloses an angular velocity sensor abnormality diagnosis apparatus that performs abnormality diagnosis during a primary check based on the level of the angular velocity output signal in a state in which an inspection signal (e.g., pseudo-rotation signal) is input to a sensor element.

The vibrating gyroscope apparatus disclosed in Japanese Patent No. 3520821 is configured so that the offset signal is generated in the preceding stage of a differential amplifier means, and an abnormality of the detection means is detected based on a signal component due to the offset signal. This method can detect a circuit abnormality in the subsequent stage of the differential amplifier means, but cannot detect an element abnormality or a circuit abnormality in the preceding stage of the differential amplifier means.

Since the abnormality diagnosis apparatus disclosed in JP-A-2001-304871 performs abnormality diagnosis based on the level of the angular velocity output signal in a state in which the inspection signal (e.g., pseudo-rotation signal) is input to the sensor element, it may be possible to detect an element abnormality. However, since the abnormality diagnosis apparatus disclosed in JP-A-2001-304871 inputs the inspection signal (e.g., pseudo-rotation signal) that is not present during a normal angular velocity detection operation to the sensor element, an element abnormality that occurs during a normal angular velocity detection operation cannot be accurately detected. This poses a reliability problem.

SUMMARY

According to a first aspect of the invention, there is provided a physical quantity detection apparatus that detects a given physical quantity, the physical quantity detection apparatus comprising:

a physical quantity detection element that includes a drive electrode and a detection electrode, and vibrates based on a drive signal supplied to the drive electrode so that a physical quantity detection signal that corresponds to the magnitude of the physical quantity and a leakage signal of vibrations based on the drive signal flow through the detection electrode;

a driver section that generates the drive signal;

a synchronous detection section that performs a synchronous detection process on a detection target signal that includes the physical quantity detection signal and the leakage signal based on a detection signal that is synchronized with the drive signal; and a timing change section that changes a relative timing of at least one of a rising edge and a falling edge of the detection signal with respect to the detection target signal based on a control signal so that at least part of the leakage signal is output by the synchronous detection process.

According to a second aspect of the invention, there is provided an abnormality diagnosis system for a physical quantity detection apparatus, the abnormality diagnosis system comprising:

the above physical quantity detection apparatus; and an abnormality diagnosis apparatus that supplies the control signal to the physical quantity detection apparatus, receives a signal that is generated by the physical quantity detection apparatus based on a signal output from the synchronous detection section, and diagnoses an abnormality of the physical quantity detection apparatus based on the received signal.

According to a third aspect of the invention, there is provided a method of controlling a physical quantity detection apparatus that includes a physical quantity detection element that includes a drive electrode and a detection electrode, and vibrates based on a drive signal supplied to the drive electrode so that a physical quantity detection signal that corresponds to the magnitude of a given physical quantity and a leakage signal of vibrations based on the drive signal flow through the detection electrode, a driver section that generates the drive signal, and a synchronous detection section that performs a synchronous detection process on a detection target signal that includes the physical quantity detection signal and the leakage signal based on a detection signal that is synchronized with the drive signal, the method comprising:

causing the physical quantity detection apparatus to change a relative timing of at least one of a rising edge and a falling edge of the detection signal with respect to the detection target signal so that at least part of the leakage signal is output, and perform the synchronous detection process; and causing the physical quantity detection apparatus to generate a signal that corresponds to the leakage signal based on a signal output from the synchronous detection section.

According to a fourth aspect of the invention, there is provided a method of controlling a physical quantity detection apparatus that includes a physical quantity detection element that includes a drive electrode and a detection electrode, and vibrates based on a drive signal supplied to the drive electrode so that a physical quantity detection signal that corresponds to the magnitude of a given physical quantity and a leakage signal of vibrations based on the drive signal flow through the detection electrode, a driver section that generates the drive signal, and a synchronous detection section that performs a synchronous detection process on a detection target signal that includes the physical quantity detection signal and the leakage signal based on a detection signal that is synchronized with the drive signal, the method comprising:

causing the physical quantity detection apparatus to change a relative timing of at least one of a rising edge and a falling edge of the detection signal with respect to the detection target signal so that at least part of the leakage signal is output, and perform the synchronous detection process; and causing the physical quantity detection apparatus to determine presence or absence of an abnormality of the physical quantity detection apparatus based on a signal output from the synchronous detection section.

DETAILED DESCRIPTION OF THE EMBODIMENT

Figure 1:
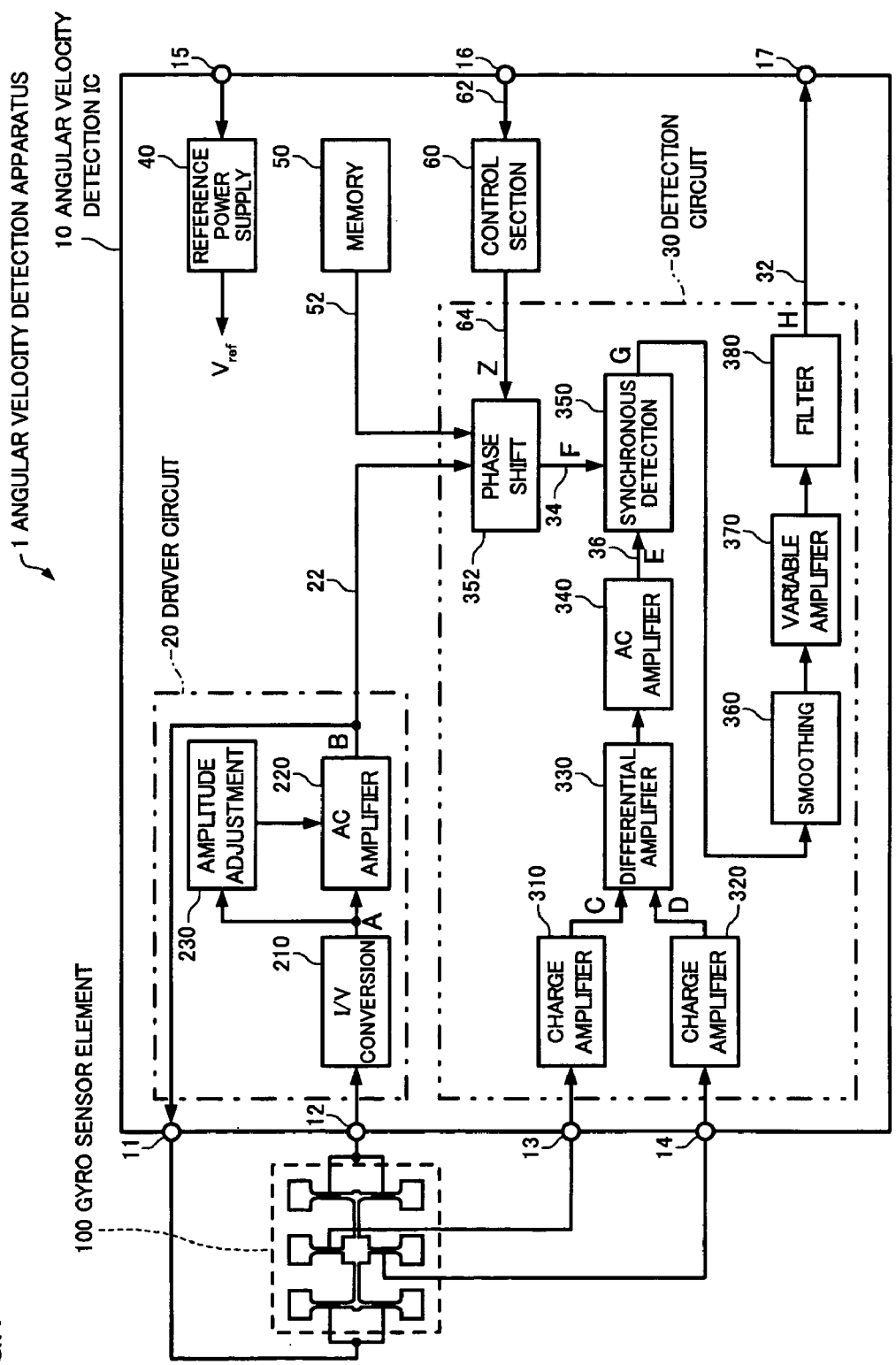
FIG. 1 is a diagram illustrating the configuration of an angular velocity detection apparatus according to the first embodiment of the invention.

The invention may provide a physical quantity detection apparatus that implements abnormality diagnosis with improved reliability, a method of controlling a physical quantity detection apparatus, an abnormality diagnosis system, and an abnormality diagnosis method.

(1) According to one embodiment of the invention, there is provided a physical quantity detection apparatus that detects a given physical quantity, the physical quantity apparatus comprising:

a physical quantity detection element that includes a drive electrode and a detection electrode, and vibrates based on a drive signal supplied to the drive electrode so that a physical quantity detection signal that corresponds to the magnitude of the physical quantity and a leakage signal of vibrations based on the drive signal flow through the detection electrode;

a driver section that generates the drive signal;

a synchronous detection section that performs a synchronous detection process on a detection target signal that includes the physical quantity detection signal and the leakage signal based on a detection signal that is synchronized with the drive signal; and a timing change section that changes a relative timing of at least one of a rising edge and a falling edge of the detection signal with respect to the detection target signal based on a control signal so that at least part of the leakage signal is output by the synchronous detection process.

The given physical quantity may be an angular velocity, acceleration, terrestrial magnetism, pressure, etc.

The timing change section may change the relative timing by changing the timing of at least one of the rising edge and the falling edge of the detection signal, or may change the relative timing by changing the timing of at least one of the rising edge and the falling edge of the detection target signal.

The detection signal may be a square wave (rectangular wave) or a sine wave, for example. The term "rising edge" used herein refers to a timing at which the detection signal coincides with a threshold value when the detection signal changes from a minimum to a maximum. The term "falling edge" used herein refers to a timing at which the detection signal coincides with a threshold value when the detection signal changes from a maximum to a minimum.

According to this embodiment, at least part of the leakage signal is detected by changing the relative timing of at least one of the rising edge and the falling edge of the detection signal with respect to the detection target signal, and performing the synchronous detection process. The amount of the physical quantity detection signal and the amount of the leakage signal change along with a change in the vibration state of the physical quantity detection element. Therefore, a circuit abnormality and an element abnormality can be diagnosed based on the signal output from the synchronous detection section.

This embodiment utilizes the leakage signal for abnormality diagnosis. Since the leakage signal is generated based on the vibration balance of the driving vibrations, a small change in the driving vibration appears in the leakage signal. An abnormality including an element abnormality can be reliably detected during abnormality diagnosis by detecting a change in the driving vibrations based on which the Coriolis force occurs by utilizing the leakage signal. This makes it possible to implement abnormality diagnosis with improved reliability.

(2) In the above physical quantity detection apparatus, the timing change section may change a phase difference between the detection signal and the detection target signal based on the control signal.

For example, the timing change section may change the phase difference between the detection signal and the detection target signal by changing the phase of the detection signal, or may change the phase difference between the detection signal and the detection target signal by changing the phase of the detection target signal.

According to this embodiment, the timing change section changes the relative timing of at least one of the rising edge and the falling edge of the detection signal with respect to the detection target signal by changing the phase difference between the detection signal and the detection target signal. Therefore, since at least part of the leakage signal is detected by the synchronous detection process, an element abnormality can be diagnosed based on the signal output from the synchronous detection section.

(3) In the above physical quantity detection apparatus, the timing change section may change a duty ratio of the detection signal based on the control signal.

According to this embodiment, the timing change section changes the relative timing of at least one of the rising edge and the falling edge of the detection signal with respect to the detection target signal by changing the duty ratio of the detection signal. Therefore, since at least part of the leakage signal is detected by the synchronous detection process, an element abnormality can be diagnosed based on the signal output from the synchronous detection section.

(4) In the above physical quantity detection apparatus, a change amount of the relative timing may be adjustable by the timing change section.

For example, the change amount of the relative timing may be adjusted in advance so that a predetermined amount of the leakage signal is detected by the synchronous detection process, and may be stored in a nonvolatile memory.

The amount of leakage signal that flows through the detection electrode differs depending on the physical quantity detection element due to a production variation, etc. According to this embodiment, since the change amount of the relative timing of at least one of the rising edge and the falling edge of the detection signal with respect to the detection target signal can be adjusted, the amount of the leakage signal detected by the synchronous detection process can be made constant depending on the characteristics of the physical quantity detection element. The abnormality diagnosis accuracy can be improved by thus reducing the effects of a variation in characteristics of the physical quantity detection element.

(5) The above physical quantity detection apparatus may further comprise an abnormality determination section that determines presence or absence of an abnormality of the physical quantity detection apparatus based on a signal output from the synchronous detection section.

According to this embodiment, since the presence or absence of an abnormality of the physical quantity detection apparatus is determined by the abnormality determination section, the presence or absence of an abnormality of the physical quantity detection apparatus can be directly determined by monitoring the signal output from the abnormality determination section.

(6) In the above physical quantity detection apparatus, the physical quantity may be an angular velocity.

(7) According to one embodiment of the invention, there is provided an abnormality diagnosis system for a physical quantity detection apparatus, the abnormality diagnosis system comprising:

the above physical quantity detection apparatus; and an abnormality diagnosis apparatus that supplies the control signal to the physical quantity detection apparatus, receives a signal that is generated by the physical quantity detection apparatus based on a signal output from the synchronous detection section, and diagnoses an abnormality of the physical quantity detection apparatus based on the received signal.

The above abnormality diagnosis system can diagnose a circuit abnormality and an element abnormality of the physical quantity detection apparatus, and can implement abnormality diagnosis with improved reliability.

(8) According to one embodiment of the invention, there is provided a method of controlling a physical quantity detection apparatus that includes a physical quantity detection element that includes a drive electrode and a detection electrode, and vibrates based on a drive signal supplied to the drive electrode so that a physical quantity detection signal that corresponds to the magnitude of a given physical quantity and a leakage signal of vibrations based on the drive signal flow through the detection electrode, a driver section that generates the drive signal, and a synchronous detection section that performs a synchronous detection process on a detection target signal that includes the physical quantity detection signal and the leakage signal based on a detection signal that is synchronized with the drive signal, the method comprising:

causing the physical quantity detection apparatus to change a relative timing of at least one of a rising edge and a falling edge of the detection signal with respect to the detection target signal so that at least part of the leakage signal is output, and perform the synchronous detection process; and causing the physical quantity detection apparatus to generate a signal that corresponds to the leakage signal based on a signal output from the synchronous detection section.

The above method can diagnose a circuit abnormality and an element abnormality of the physical quantity detection apparatus, and can implement abnormality diagnosis with improved reliability.

(9) According to one embodiment of the invention, there is provided a method of controlling a physical quantity detection apparatus that includes a physical quantity detection element that includes a drive electrode and a detection electrode, and vibrates based on a drive signal supplied to the drive electrode so that a physical quantity detection signal that corresponds to the magnitude of a given physical quantity and a leakage signal of vibrations based on the drive signal flow through the detection electrode, a driver section that generates the drive signal, and a synchronous detection section that performs a synchronous detection process on a detection target signal that includes the physical quantity detection signal and the leakage signal based on a detection signal that is synchronized with the drive signal, the method comprising:

causing the physical quantity detection apparatus to change a relative timing of at least one of a rising edge and a falling edge of the detection signal with respect to the detection target signal so that at least part of the leakage signal is output, and perform the synchronous detection process; and causing the physical quantity detection apparatus to determine presence or absence of an abnormality of the physical quantity detection apparatus based on a signal output from the synchronous detection section.

The above method can diagnose a circuit abnormality and an element abnormality of the physical quantity detection apparatus, and can implement abnormality diagnosis with improved reliability.

Moreover, the presence or absence of an abnormality (including an element abnormality) of the physical quantity detection apparatus can be directly determined by monitoring the signal output from the abnormality determination section.

(10) According to one embodiment of the invention, there is provided an abnormality diagnosis method for a physical quantity detection apparatus that includes a physical quantity detection element that includes a drive electrode and a detection electrode, and vibrates based on a drive signal supplied to the drive electrode so that a physical quantity detection signal that corresponds to the magnitude of a given physical quantity and a leakage signal of vibrations based on the drive signal flow through the detection electrode, a driver section that generates the drive signal, and a synchronous detection section that performs a synchronous detection process on a detection target signal that includes the physical quantity detection signal and the leakage signal based on a detection signal that is synchronized with the drive signal, the method comprising:

causing the physical quantity detection apparatus to change a relative timing of at least one of a rising edge and a falling edge of the detection signal with respect to the detection target signal so that at least part of the leakage signal is output, and perform the synchronous detection process;

causing the physical quantity detection apparatus to generate a signal that corresponds to the leakage signal based on a signal output from the synchronous detection section; and diagnosing an abnormality of the physical quantity detection apparatus based on the signal that corresponds to the leakage signal.

The above method can diagnose a circuit abnormality and an element abnormality of the physical quantity detection apparatus, and can implement abnormality diagnosis with improved reliability.

Some embodiments of the invention will be described in detail below with reference to the drawings. Note that the following embodiments do not in any way limit the scope of the invention defined by the claims laid out herein. Note also that all of the elements described below should not be necessarily taken as essential requirements for the invention.

1. Physical Quantity Detection Apparatus

The following embodiments illustrate an example of a physical quantity detection apparatus (angular velocity detection apparatus) that detects an angular velocity as a physical quantity. Note that the following embodiments may be applied to an apparatus that detects an arbitrary physical quantity (e.g., angular velocity, acceleration, terrestrial magnetism, or pressure).

First Embodiment

FIG. 1 is a diagram illustrating the configuration of an angular velocity detection apparatus according to a first embodiment of the invention.

An angular velocity detection apparatus 1 according to the first embodiment includes a gyro sensor element 100 and an angular velocity detection IC 10.

The gyro sensor element 100 (i.e., physical quantity detection element according to this embodiment) includes a vibrating element that includes a drive electrode and a detection electrode and is sealed in a package (not illustrated). The package normally has seal-tightness in order to reduce the impedance of the vibrating element to improve the vibration efficiency as much as possible.

The vibrating element of the gyro sensor element 100 may be formed of a piezoelectric material such as a piezoelectric single crystal (e.g., quartz crystal ($SiO_2$), lithium tantalate ($LiTaO_3$), or lithium niobate ($LiNbO_3$)) or a piezoelectric ceramic (e.g., lead zirconate titanate (PZT)), or may have a structure in which a piezoelectric thin film (e.g., zinc oxide (ZnO) or aluminum nitride (AlN)) is disposed between the drive electrodes on the surface of semiconductor silicon.

The vibrating element may have a double-T structure that includes two T-shaped drive vibrating arms, a tuning-fork structure, or a tuning-bar structure in the shape of a triangular prism, a quadrangular prism, or a column, for example.

In this embodiment, the gyro sensor element 100 includes a double-T-shaped vibrating element that is formed of a quartz crystal.

Figure 2:
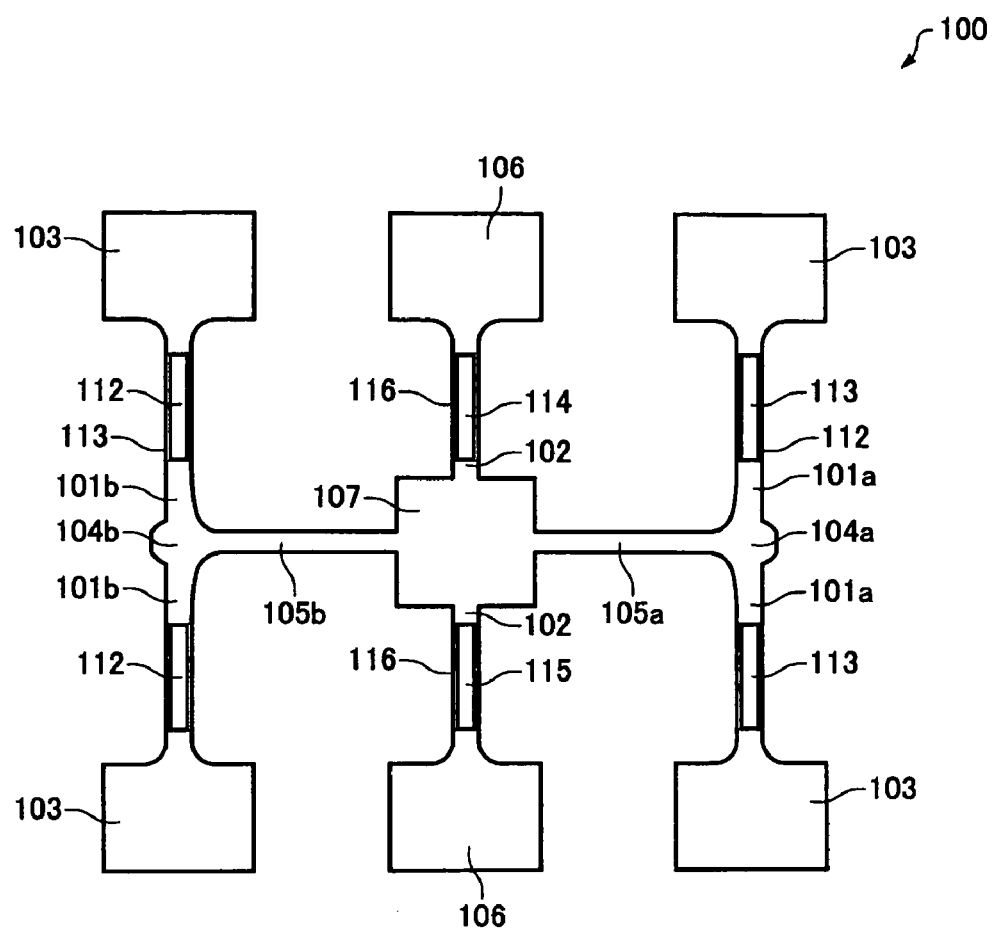
FIG. 2 is a plan view illustrating a vibrating element of a gyro sensor element.

FIG. 2 is a plan view illustrating the vibrating element of the gyro sensor element 100 according to this embodiment.

The gyro sensor element 100 according to this embodiment includes a double-T-shaped vibrating element that is formed using a Z-cut quartz crystal substrate. A vibrating element formed of a quartz crystal has an advantage in that the angular velocity detection accuracy can be improved since the resonance frequency changes to only a small extent due to a change in temperature. Note that the X-axis, the Y-axis, and the Z-axis illustrated in FIG. 2 indicate the axes of the quartz crystal.

As illustrated in FIG. 2, the vibrating element of the gyro sensor element 100 includes drive vibrating arms 101a and 101b that extend respectively from drive bases 104a and 104b in the +Y-axis direction and the −Y-axis direction. Drive electrodes 112 and 113 are respectively formed on the side surface and the upper surface of the drive vibrating arm 101a, and drive electrodes 113 and 112 are respectively formed on the side surface and the upper surface of the drive vibrating arm 101b. The drive electrodes 112 and 113 are connected to a driver circuit 20 respectively via an external output terminal 11 and an external input terminal 12 of the angular velocity detection IC 10 illustrated in FIG. 1.

The drive bases 104a and 104b are connected to a rectangular detection base 107 via connection arms 105a and 105b that respectively extend in the −X-axis direction and the +X-axis direction.

Detection vibrating arms 102 extend from the detection base 107 in the +Y-axis direction and the −Y-axis direction. Detection electrodes 114 and 115 are formed on the upper surface of the detection vibrating arms 102, and common electrodes 116 are formed on the side surface of the detection vibrating arms 102. The detection electrodes 114 and 115 are connected to a detection circuit 30 respectively via external input terminals 13 and 14 of the angular velocity detection IC 10 illustrated in FIG. 1. The common electrodes 116 are grounded.

Figure 3:
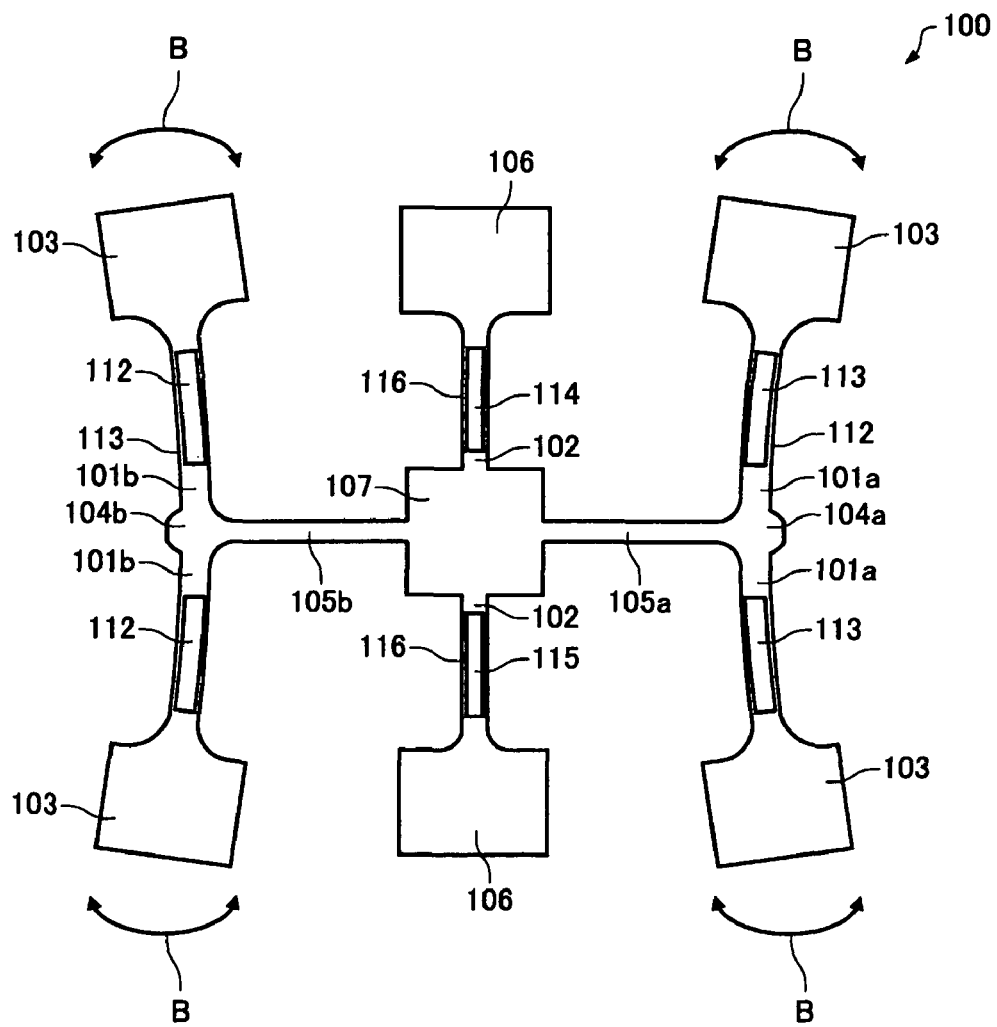
FIG. 3 illustrates the operation of a gyro sensor element.

When an alternating voltage (drive signal) is applied between the drive electrodes 112 and 113 of the drive vibrating arms 101a and 101b, the drive vibrating arms 101a and 101b produce flexural vibrations (excited vibrations) so that the ends of the drive vibrating arms 101a and 101b repeatedly move closer and away (see arrow B) due to an inverse piezoelectric effect (see FIG. 3).

Note that the expression "the vibration energy of the drive vibrating arms is balanced" used herein refers to a case where the magnitude of the vibration energy or the vibration amplitude of each drive vibrating arm is equal when the drive vibrating arms produce flexural vibrations (excited vibrations) in a state in which an angular velocity is not applied to the gyro sensor element.

Figure 4:
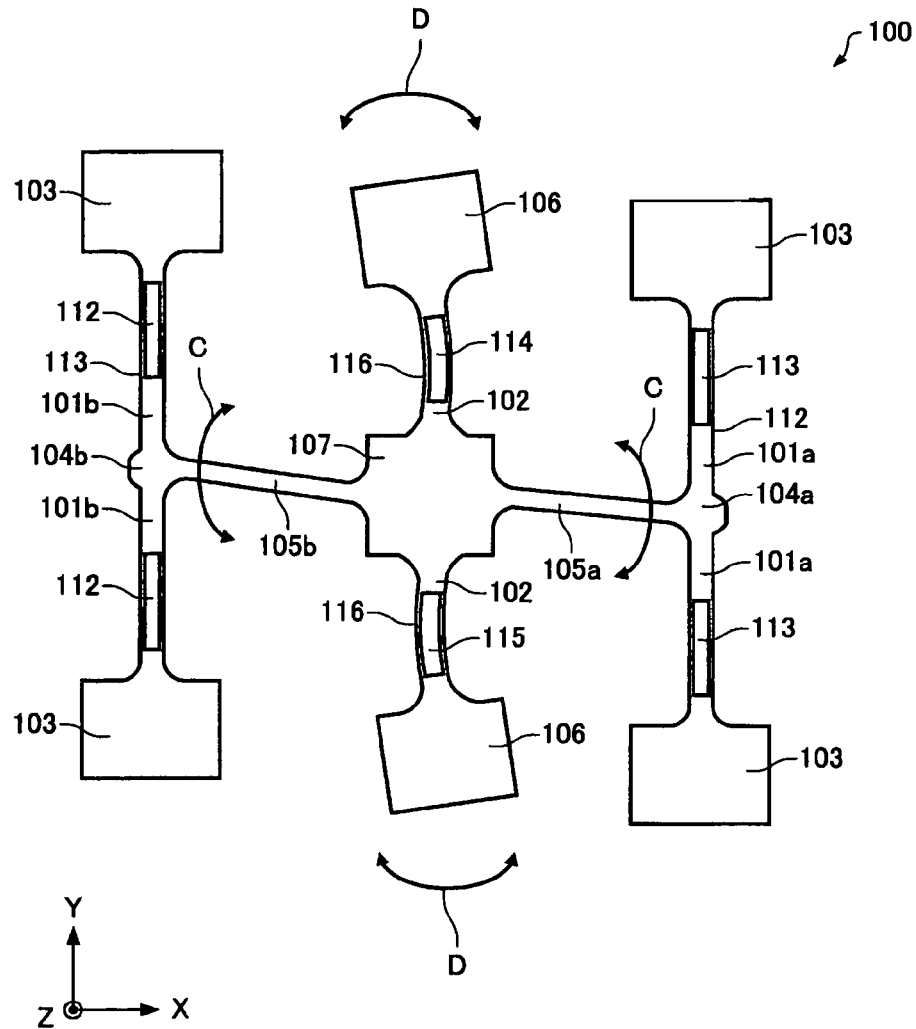
FIG. 4 illustrates the operation of a gyro sensor element.

When an angular velocity around the Z-axis is applied to the vibrating element of the gyro sensor element 100, the drive vibrating arms 101a and 101b are subjected to a Coriolis force in the direction that is perpendicular to the direction of the flexural vibrations (see arrow B) and the Z-axis. Therefore, the connection arms 105a and 105b produce vibrations (see arrow C), as illustrated in FIG. 4. The detection vibrating arms 102 produce flexural vibrations (see arrow D) in synchronization with the vibrations (see arrow C) of the connection arms 105a and 105b.

When the vibration energy of the drive vibrating arms has become imbalanced due to a production variation, etc., of the gyro sensor element, the excited vibrations of the drive vibrating arms 101a and 101b cause the detection vibrating arms 102 to produce leakage vibrations. The leakage vibrations are flexural vibrations (see arrow D) in the same manner as the vibrations based on the Coriolis force, but occur in the same phase as the drive signal. The vibrations based on the Coriolis force differ in phase from the driving vibrations by 90°.

An alternating charge based on the flexural vibrations occurs in the detection electrodes 114 and 115 of the detection vibrating arms 102 due to a piezoelectric effect. An alternating charge that is generated based on the Coriolis force changes depending on the magnitude of the Coriolis force (i.e., the magnitude of the angular velocity applied to the gyro sensor element 100). On the other hand, an alternating charge that is generated based on the leakage vibrations is independent of the magnitude of the angular velocity applied to the gyro sensor element 100.

In the configuration illustrated in FIG. 2, the detection base 107 is disposed at the center of the vibrating element, and the detection vibrating arms 102 are disposed to extend from the detection base 107 in the +Y-axis direction and the −Y-axis direction in order to improve the balance of the vibrating element. The connection arms 105a and 105b are disposed to extend from the detection base 107 in the +X-axis direction and the −X-axis direction, and the drive vibrating arms 101a and 101b are disposed to extend from the connection arms 105a and 105b in the +Y-axis direction and the −Y-axis direction.

A rectangular weight section 103 that is wider than the drive vibrating arms 101a and 101b is formed at the end of the drive vibrating arms 101a and 101b. This makes it possible to increase the Coriolis force while obtaining the desired resonance frequency using relatively short vibrating arms. A weight section 106 that is wider than the detection vibrating arms 102 is formed at the end of the detection vibrating arm 102. This makes it possible to increase the amount of alternating charge that flows through the detection electrodes 114 and 115.

The gyro sensor element 100 thus outputs an alternating charge (i.e., angular velocity detection signal (physical quantity detection signal)) that is generated based on the Coriolis force and an alternating charge (i.e., leakage signal) that is generated based on the leakage vibrations of the excited vibrations via the detection electrodes 114 and 115 (detection axis: Z-axis).

A Coriolis force $F_c$ applied to the gyro sensor element 100 is calculated by the following expression (1):

$$F_c = 2mv\Omega \quad (1)$$

where, m is an equivalent mass, v is a vibration velocity, and $\Omega$ is an angular velocity. As is clear from the expression (1), the Coriolis force changes due to a change in equivalent mass m or vibration velocity v, even if the angular velocity $\Omega$ is constant. Therefore, the angular velocity detection sensitivity changes due to a change in equivalent mass m or vibration velocity v. When the vibration state of the vibrating element of the gyro sensor element 100 has changed due to failure, the equivalent mass m or the vibration velocity v of the driving vibrations changes, so that the detection sensitivity changes. The level of the leakage signal also changes due to a change in equivalent mass m or vibration velocity v. Specifically, the level of the leakage signal has a correlation with the angular velocity detection sensitivity.

Again referring to FIG. 1, the angular velocity detection IC 10 includes the driver circuit 20, the detection circuit 30, a reference power supply circuit 40, a memory 50, and a control section 60.

The driver circuit 20 includes an I/V conversion circuit (current/voltage conversion circuit) 210, an AC amplifier circuit 220, and an amplitude adjustment circuit 230.

The I/V conversion circuit 210 converts a drive current that flows through the vibrating element of the gyro sensor element 100 into an alternating voltage signal.

The alternating voltage signal output from the I/V conversion circuit 210 is input to the AC amplifier circuit 220 and the amplitude adjustment circuit 230. The AC amplifier circuit 220 amplifies the alternating voltage signal input thereto, clips the signal to a predetermined voltage value, and outputs a square-wave voltage signal 22. The amplitude adjustment circuit 230 changes the amplitude of the square-wave voltage signal 22 based on the level of the alternating voltage signal output from the IN conversion circuit 210, and controls the AC amplifier circuit 220 so that a constant drive current is maintained.

The square-wave voltage signal 22 is supplied to the drive electrode 112 of the vibrating element of the gyro sensor element 100 via the external output terminal 11. The gyro sensor element 100 continuously produces predetermined driving vibrations (see FIG. 3). The drive vibrating arms 101a and 101b of the gyro sensor element 100 produce vibrations at a constant velocity by maintaining a constant drive current. Therefore, the vibration velocity based on which the Coriolis force is produced becomes constant, so that the sensitivity is further stabilized.

The driver circuit 20 functions as a driver section according to this embodiment.

The detection circuit 30 includes charge amplifier circuits 310 and 320, a differential amplifier circuit 330, an AC amplifier circuit 340, a synchronous detection circuit 350, a smoothing circuit 360, a variable amplifier circuit 370, a filter circuit 380, and a phase shift circuit 352.

An alternating charge that includes the angular velocity detection signal and the leakage signal is input to the charge amplifier circuit 310 from the detection electrode 114 of the vibrating element of the gyro sensor element 100 via the external input terminal 13.

An alternating charge that includes the angular velocity detection signal and the leakage signal is input to the charge amplifier circuit 320 from the detection electrode 115 of the vibrating element of the gyro sensor element 100 via the external input terminal 14.

Each of the charge amplifier circuits 310 and 320 converts the alternating charge input thereto into an alternating voltage signal based on a reference voltage $V_{ref}$. The reference power supply circuit 40 generates the reference voltage $V_{ref}$ based on an external power supply voltage input via a power supply input terminal 15.

The differential amplifier circuit 330 differentially amplifies the signal output from the charge amplifier circuit 310 and the signal output from the charge amplifier circuit 320. The differential amplifier circuit 330 removes an in-phase component, and amplifies an out-of-phase component.

The AC amplifier circuit 340 amplifies the signal output from the differential amplifier circuit 330. The signal output from the AC amplifier circuit 340 includes the angular velocity detection signal and the leakage signal, and is input to the synchronous detection circuit 350 as a detection target signal 36.

The synchronous detection circuit 350 performs a synchronous detection process on the detection target signal 36 using a detection signal 34. The synchronous detection circuit 350 may be configured as a switch circuit that selects the signal output from the AC amplifier circuit 340 when the voltage level of the detection signal 34 is higher than the reference voltage $V_{ref}$, and selects a signal obtained by inverting the signal output from the AC amplifier circuit 340 with respect to the reference voltage $V_{ref}$ when the voltage level of the detection signal 34 is lower than the reference voltage $V_{ref}$.

The synchronous detection circuit 350 functions as a synchronous detection section according to this embodiment.

The phase shift circuit 352 generates the detection signal 34 having the same phase as that of the square-wave voltage signal 22 when a control signal 64 is set at a first potential (hereinafter referred to as "low potential"), and generates the detection signal 34 that has a phase difference corresponding to a phase shift amount 52 stored in the memory 50 with respect to the square-wave voltage signal 22 when the control signal 64 is set at a second potential (hereinafter referred to as "high potential").

Figure 5:
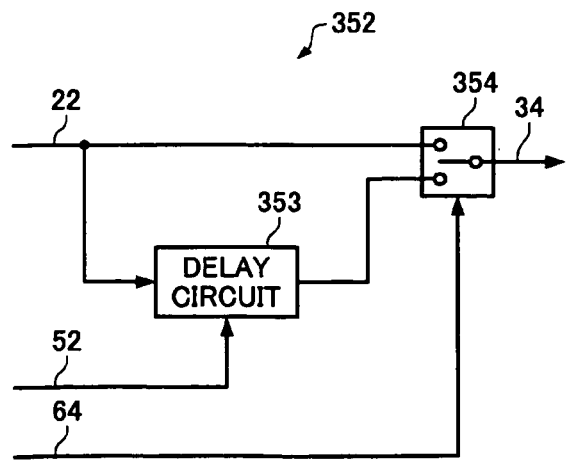
FIG. 5 is a diagram illustrating an example of the configuration of a phase shift circuit.

As illustrated in FIG. 5, the phase shift circuit 352 may be implemented using a delay circuit 353 and switch circuit 354, for example. The switch circuit 354 selects the square-wave voltage signal 22 as the detection signal 34 when the control signal 64 is set at the low potential, and selects a signal obtained by delaying the square-wave voltage signal 22 based on the phase shift amount 52 using the delay circuit 353 as the detection signal 34 when the control signal 64 is set at the high potential.

The phase shift circuit 352 functions as a timing change section according to this embodiment.

The control section 60 fixes the control signal 64 at the low potential in an angular velocity detection mode (during normal operation), and fixes the control signal 64 at the high potential when an abnormal diagnosis mode setting signal 62 has been supplied via an external input terminal 16. The control section 60 may be implemented by a dedicated logic circuit or a general-purpose CPU, for example.

The signal output from the synchronous detection circuit 350 is smoothed into a direct voltage signal by the smoothing circuit 360, and input to the variable amplifier circuit 370.

The variable amplifier circuit 370 adjusts the detection sensitivity by amplifying (or attenuating) the signal (direct voltage signal) output from the smoothing circuit 360 by an amplification factor (or attenuation factor) that has been set. The signal that has been amplified (or attenuated) by the variable amplifier circuit 370 is input to the filter circuit 380.

The filter circuit 380 limits the frequency of the signal output from the variable amplifier circuit 370 to a frequency band that is appropriate for the application, and generates an angular velocity signal 32. The angular velocity signal 32 is output to the outside via an external output terminal 17.

The operation of the angular velocity detection apparatus 1 according to the first embodiment in the angular velocity detection mode (during normal operation) is described in detail below using examples of signal waveforms at points Z and A to H illustrated in FIG. 1.

Figure 6:
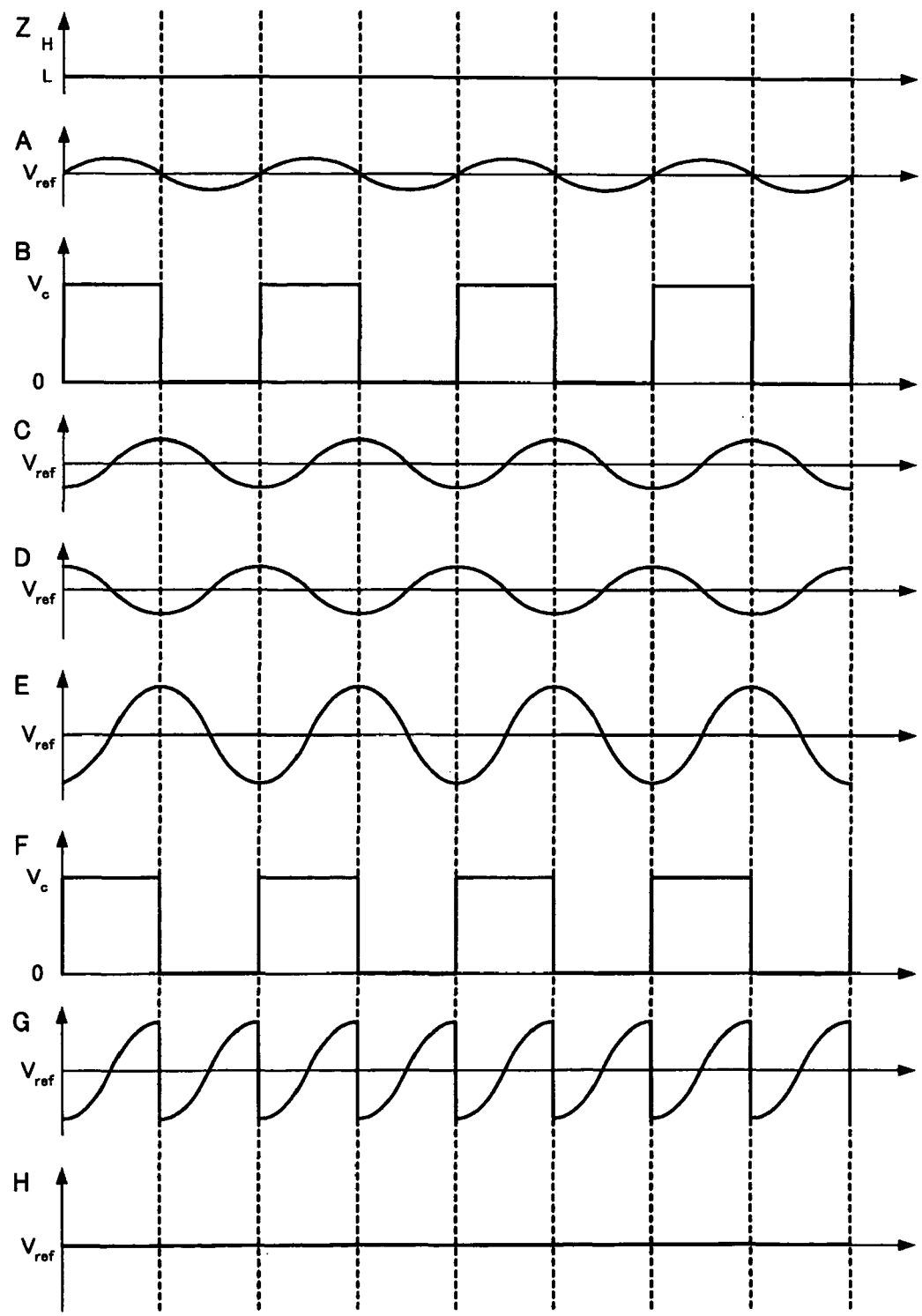
FIG. 6 is a diagram illustrating signal waveform examples according to the first embodiment of the invention when an angular velocity detection apparatus stands still in an angular velocity detection mode (during normal operation).

FIG. 6 is a diagram illustrating signal waveform examples when the angular velocity detection apparatus 1 stands still. In FIG. 6, the horizontal axis indicates time, and the vertical axis indicates voltage.

In the angular velocity detection mode (during normal operation), the control signal 64 (signal at the point Z) is fixed at the low potential (see FIG. 6).

When the vibrating element of the gyro sensor element 100 vibrates, an alternating voltage that has a constant frequency and is obtained by converting a current that is fed back from the drive electrode 113 of the vibrating element of the gyro sensor element 100 is generated at the output (point A) of the I/V conversion circuit 210. Specifically, a sine-wave voltage signal that has a constant frequency is generated at the output (point A) of the I/V conversion circuit 210.

A square-wave voltage signal that has a constant amplitude $V_c$ and is obtained by amplifying the signal output from the I/V conversion circuit 210 (signal at the point A) is generated at the output (point B) of the AC amplifier circuit 220.

When an angular velocity is not applied to the gyro sensor element 100, an angular velocity detection signal does not flow through the detection electrodes 114 and 115 of the vibrating element of the gyro sensor element 100, but a leakage signal flows through the detection electrodes 114 and 115 of the vibrating element of the gyro sensor element 100.

The leakage signals (alternating charge) that flow through the detection electrodes 114 and 115 of the gyro sensor element 100 are converted into alternating voltage signals by the charge amplifier circuits 310 and 320. The phase of the alternating voltage signal output from the charge amplifier circuit 310 is the reverse of the phase of the alternating voltage signal output from the charge amplifier circuit 320. Therefore, sine-wave voltage signals having the same frequency as that of the signal output from the AC amplifier circuit 220 (signal at the point B) are generated at the outputs (points C and D) of the charge amplifier circuits 310 and 320. The phase of the signal output from the charge amplifier circuit 310 (signal at the point C) is shifted from the phase of the signal output from the AC amplifier circuit 220 (signal at the point B) by 90°. The phase of the signal output from the charge amplifier circuit 320 (signal at the point D) is the reverse of (shifted by 180° from) the phase of the signal output from the charge amplifier circuit 310 (signal at the point C).

The signals output from the charge amplifier circuits 310 and 320 (signals at the points C and D) are differentially amplified by the differential amplifier circuit 330, and a sine-wave voltage signal that has the same frequency and the same phase as those of the sine-wave voltage signal generated at the output (point C) of the charge amplifier circuit 310 is generated at the output (point E) of the AC amplifier circuit 340. The sine-wave voltage signal that is generated at the output (point E) of the AC amplifier circuit 340 corresponds to the leakage signals that flow through the detection electrodes 114 and 115 of the vibrating element of the gyro sensor element 100.

The signal output from the AC amplifier circuit 340 (signal at the point E) is synchronously detected by the synchronous detection circuit 350 based on the detection signal 34. Since the control signal 64 (signal at the point Z) is fixed at the low potential, the detection signal 34 (signal output from the phase shift circuit 352 (signal at the point F)) is a square-wave voltage signal that has the same phase as that of the square-wave voltage signal output from the AC amplifier circuit 220 (signal at the point B).

Since the phase of the signal output from the AC amplifier circuit 340 (signal at the point E) is shifted from the phase of the detection signal 34 (signal output from the phase shift circuit 352 (signal at the point F)) by 90°, the signal output from the synchronous detection circuit 350 (signal at the point G) is characterized in that the integral quantity of the voltage that is higher than the reference voltage $V_{ref}$ is equal to the integral quantity of the voltage that is lower than the reference voltage $V_{ref}$. Therefore, the leakage signal is canceled, and a direct voltage signal that is set at the reference voltage $V_{ref}$ and indicates that the angular velocity is zero is generated at the output (point H) of the filter circuit 380.

Figure 7:
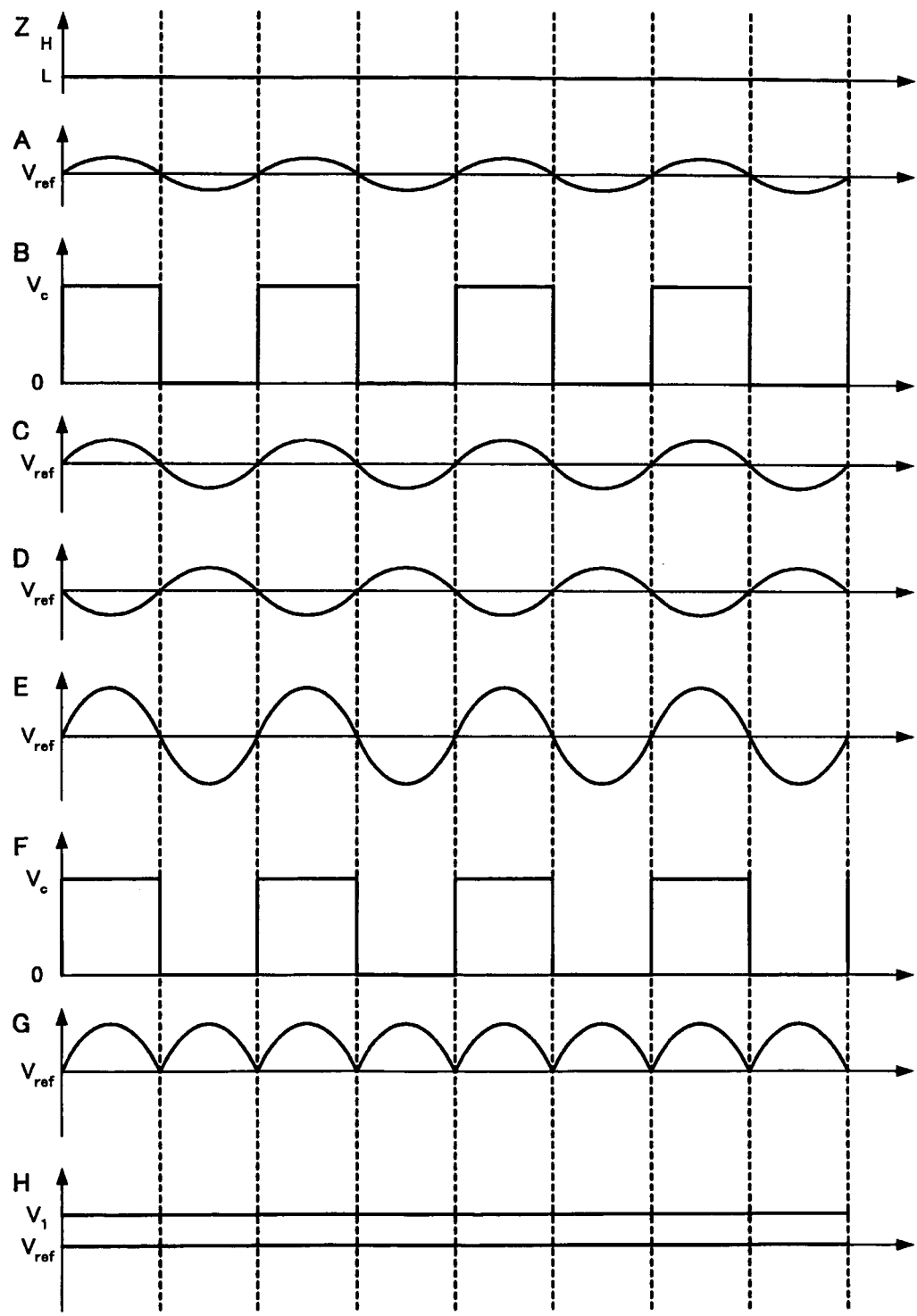
FIG. 7 is a diagram illustrating signal waveform examples according to the first embodiment of the invention when an angular velocity is applied to an angular velocity detection apparatus in an angular velocity detection mode (during normal operation).

FIG. 7 is a diagram illustrating signal waveform examples when an angular velocity is applied to the angular velocity detection apparatus 1. In FIG. 7, the horizontal axis indicates time, and the vertical axis indicates voltage.

In the angular velocity detection mode (during normal operation), the control signal 64 (signal at the point Z) is fixed at the low potential (see FIG. 7).

The signal waveforms at the points A and B are the same as those illustrated in FIG. 6. Therefore, description thereof is omitted.

When an angular velocity is applied to the gyro sensor element 100, an angular velocity detection signal and a leakage signal flow through the detection electrodes 114 and 115 of the vibrating element of the gyro sensor element 100. The level of the angular velocity detection signal changes depending on the magnitude of the Coriolis force. The leakage signal has the same signal waveform as that illustrated in FIG. 6 (i.e., the leakage signal is cancelled). Therefore, FIG. 7 shows the signal waveforms that focus only on the angular velocity detection signal. The following description also focuses only on the angular velocity detection signal.

The angular velocity detection signals (alternating charge) that flow through the detection electrodes 114 and 115 of the vibrating element of the gyro sensor element 100 are converted into alternating voltage signals by the charge amplifier circuits 310 and 320. Therefore, sine-wave voltage signals having the same frequency as that of the signal output from the AC amplifier circuit 220 (signal at the point B) are generated at the outputs (points C and D) of the charge amplifier circuits 310 and 320. The phase of the signal output from the charge amplifier circuit 310 (signal at the point C) is the same as the phase of the signal output from the AC amplifier circuit 220 (signal at the point B). The phase of the signal output from the charge amplifier circuit 320 (signal at the point D) is the reverse of (shifted by 180° from) the phase of the signal output from the charge amplifier circuit 310 (signal at the point C).

The signals output from the charge amplifier circuits 310 and 320 (signals at the points C and D) are differentially amplified by the differential amplifier circuit 330, and a sine-wave voltage signal that has the same frequency and the same phase as those of the sine-wave voltage signal generated at the output (point C) of the charge amplifier circuit 310 is generated at the output (point E) of the AC amplifier circuit 340. The sine-wave voltage signal that is generated at the output (point E) of the AC amplifier circuit 340 corresponds to the angular velocity detection signals that flow through the detection electrodes 114 and 115 of the gyro sensor element 100.

The signal output from the AC amplifier circuit 340 (signal at the point E) is synchronously detected by the synchronous detection circuit 350 based on the detection signal 34. Since the phase of the signal output from the AC amplifier circuit 340 (signal at the point E) is the same as the phase of the detection signal 34 (signal output from the phase shift circuit 352 (signal at the point F)), the signal output from the synchronous detection circuit 350 (signal at the point G) is a signal that is obtained by full-wave rectifying the signal output from the AC amplifier circuit 340 (signal at the point E). Therefore, a direct voltage signal (i.e., angular velocity signal 32) that has a voltage value $V_1$ corresponding to the magnitude of the angular velocity is generated at the output (point H) of the filter circuit 380.

When an angular velocity is applied to the angular velocity detection apparatus 1 in the direction opposite to the direction illustrated in FIG. 7, the waveform of the signal output from the charge amplifier circuit 310 (signal at the point C) and the waveform of the signal output from the charge amplifier circuit 320 (signal at the point D) are inverted with respect to the reference voltage $V_{ref}$. Therefore, the angular velocity signal 32 is set at a voltage lower than the reference voltage $V_{ref}$.

The angular velocity detection apparatus 1 thus detects the angular velocity. Since the voltage value of the angular velocity signal 32 is proportional to the magnitude of the Coriolis force (magnitude of the angular velocity), and the polarity of the angular velocity signal 32 is determined by the rotation direction, the angular velocity applied to the angular velocity detection apparatus 1 can be calculated based on the angular velocity signal 32.

In the angular velocity detection mode (during normal operation), an abnormality cannot be detected when the voltage value of the signal output from the filter circuit 380 (signal at the point H) is within the detectable range. An abnormality occurs due to various factors. For example, the vibration state of the gyro sensor element changes when part of the vibrating element has broken, so that the driving vibrations based on which the Coriolis force occurs change (i.e., an abnormality occurs). An abnormality may also occur due to the internal circuit of the angular velocity detection IC 10. For example, the amplification factor (or attenuation factor) of the variable amplifier circuit 370 may become abnormal due to circuit failure (e.g., open circuit or short circuit), destruction of the data stored in the memory 50, etc.

The operation of the angular velocity detection apparatus 1 according to the first embodiment in an abnormality diagnosis mode is described in detail below using examples of signal waveforms at the points Z and A to H illustrated in FIG. 1.

Figure 8:
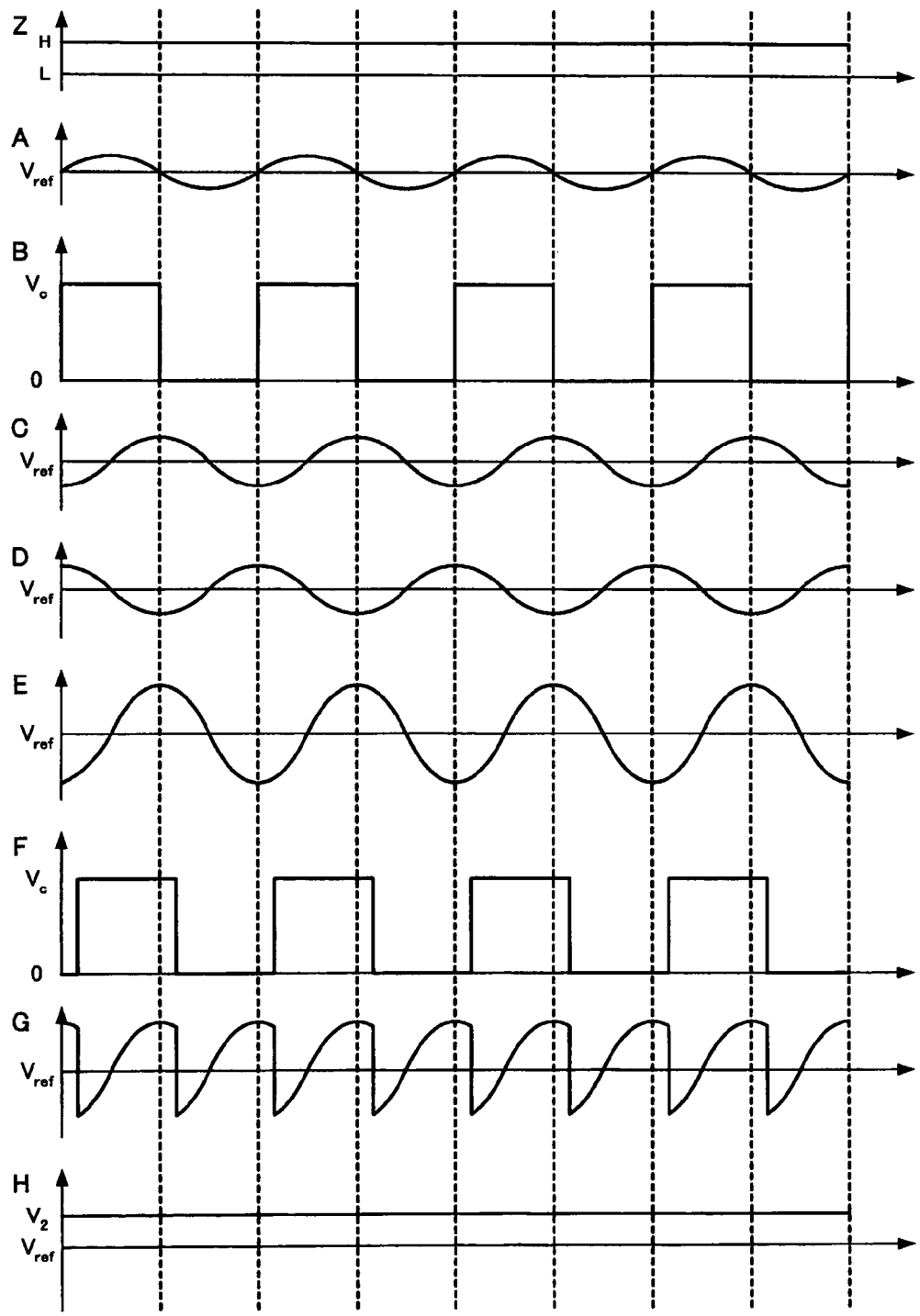
FIG. 8 is a diagram illustrating signal waveform examples according to the first embodiment of the invention in an abnormality diagnosis mode.

FIG. 8 is a diagram illustrating signal waveform examples in the abnormality diagnosis mode. In FIG. 8, the horizontal axis indicates time, and the vertical axis indicates voltage. FIG. 8 shows a case where the angular velocity detection apparatus 1 stands still.

In the abnormality diagnosis mode, the control signal 64 (signal at the point Z) is fixed at the high potential (see FIG. 8). Since the angular velocity detection apparatus 1 stands still, the signal waveforms at the points A, B, C, D, and E are the same as those illustrated in FIG. 6. Therefore, description thereof is omitted.

The signal output from the AC amplifier circuit 340 (signal at the point E) is synchronously detected by the synchronous detection circuit 350 based on the detection signal 34. Since the control signal 64 (signal at the point Z) is fixed at the high potential, the detection signal 34 (signal output from the phase shift circuit 352 (signal at the point F)) is a square-wave voltage signal that has a phase difference ($\Delta\phi$) corresponding to the phase shift amount 52 with respect to the square-wave voltage signal output from the AC amplifier circuit 220 (signal at the point B). Since the phase of the signal output from the AC amplifier circuit 340 (signal at the point E) is shifted from the phase of the detection signal 34 (signal output from the phase shift circuit 352 (signal at the point F)) by $90°-\Delta\phi$, the signal output from the synchronous detection circuit 350 (signal at the point G) is characterized in that the integral quantity of the voltage that is higher than the reference voltage $V_{ref}$ is not equal to the integral quantity of the voltage that is lower than the reference voltage $V_{ref}$. The difference in integral quantity changes depending on the signal level. Therefore, a direct voltage signal (i.e., angular velocity signal 32) that has a voltage value $V_2$ corresponding to the level of the leakage signal and the phase shift amount 52 is generated at the output (point H) of the filter circuit 380.

The angular velocity detection apparatus 1 according to the first embodiment is thus configured so that the phase shift circuit 352 changes the relative timings of the rising edge and the falling edge of the detection signal 34 with respect to the signal (detection target signal 36) output from the AC amplifier circuit 340 based on whether the control signal 64 is set at the low potential (angular velocity detection mode (during normal operation)) or the high potential (abnormality diagnosis mode). Therefore, the angular velocity signal 32 has a voltage value corresponding to the magnitude of the angular velocity in the angular velocity detection mode (during normal operation) since the leakage signal is canceled, and has a voltage value corresponding to the level of the leakage signal in the abnormality diagnosis mode.

Accordingly, the angular velocity detection apparatus 1 according to the first embodiment allows a circuit abnormality and an element abnormality to be easily determined from the outside based on the voltage value of the angular velocity signal 32 in the abnormality diagnosis mode.

In the angular velocity detection apparatus 1 according to the first embodiment, the vibration state of the gyro sensor element 100 is identical in the abnormality diagnosis mode and the angular velocity detection mode (during normal operation). Therefore, the angular velocity detection apparatus 1 according to the first embodiment allows an abnormality that occurs in the angular velocity detection mode (during normal operation) to be reliably detected in the abnormality diagnosis mode, so that an abnormality can be diagnosed with improved reliability.

When the level of the leakage signal is high, the voltage value of the angular velocity signal 32 is saturated if the phase shift amount 52 is not reduced, so that it may be impossible to determine an abnormality. Therefore, it is desirable to design the angular velocity detection apparatus so that a current based on the leakage signal that flows through the output of the differential amplifier circuit 330 is equal to or less than 1% of the drive current that flows through the gyro sensor element 100 via the external output terminal 11, taking account of the accuracy of the phase shift amount 52.

In this embodiment, the gyro sensor element 100 is formed using a double-T-shaped vibrating element. Therefore, it is easy to positively generate a leakage signal at the desired level by varying the mass of the weight section 103 at the end of each drive vibrating arm 101a by laser processing or the like so that the flexural vibrations of the drive vibrating arm 101a and the flexural vibrations of the drive vibrating arm 101b become imbalanced. In the actual application, however, the level of the leakage signal varies depending on the gyro sensor element. Therefore, the phase shift amount 52 may be adjusted during inspection of the angular velocity detection apparatus 1 before shipment so that the angular velocity signal 32 has a predetermined voltage value when the control signal 64 is set at the low potential, and may be written into the nonvolatile memory 50 (e.g., electrically erasable programmable read-only memory (EEPROM)).

When an angular velocity is applied to the angular velocity detection apparatus 1 in the abnormality diagnosis mode, the angular velocity signal 32 has a voltage value obtained by superimposing the voltage value corresponding to the level of the leakage signal on the (inaccurate) voltage value corresponding to the magnitude of the angular velocity. This makes it difficult to determine the presence or absence of an abnormality. Therefore, it is desirable to set the angular velocity detection apparatus 1 to the abnormality diagnosis mode in a state in which an angular velocity is not applied to the angular velocity detection apparatus 1 (e.g., when the angular velocity detection apparatus 1 stands still). For example, when the angular velocity detection apparatus 1 according to this embodiment is installed in a car, the angular velocity detection apparatus 1 may be set to the abnormality diagnosis mode during a primary check when starting the engine of the car.

Second Embodiment

Figure 9:
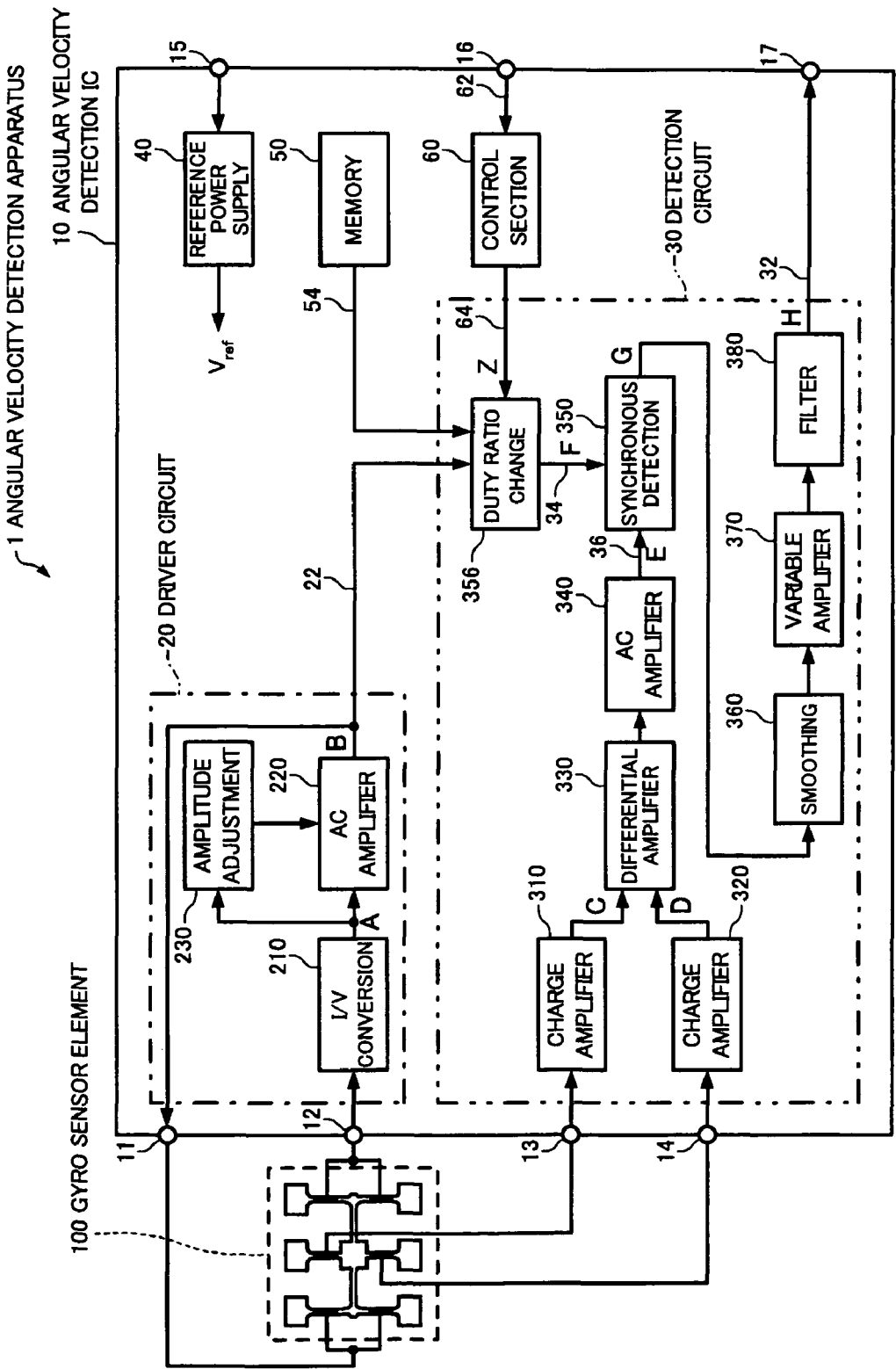
FIG. 9 is a diagram illustrating the configuration of an angular velocity detection apparatus according to the second embodiment of the invention.

FIG. 9 is a diagram illustrating the configuration of an angular velocity detection apparatus according to a second embodiment of the invention. In FIG. 9, the same sections as those illustrated in FIG. 1 are indicated by the same symbols. Description of these sections is omitted or simplified.

The second embodiment differs from the first embodiment in that a duty ratio change circuit 356 is provided instead of the phase shift circuit 352.

The duty ratio change circuit 356 generates the detection signal 34 that has the same phase as that of the square-wave voltage signal 22 at a duty ratio of 50% when the control signal 64 is set at the low potential, and generates the detection signal 34 at a duty ratio corresponding to a duty ratio change amount 54 stored in the memory 50 with respect to the square-wave voltage signal 22 when the control signal 64 is set at the high potential.

Figure 10:
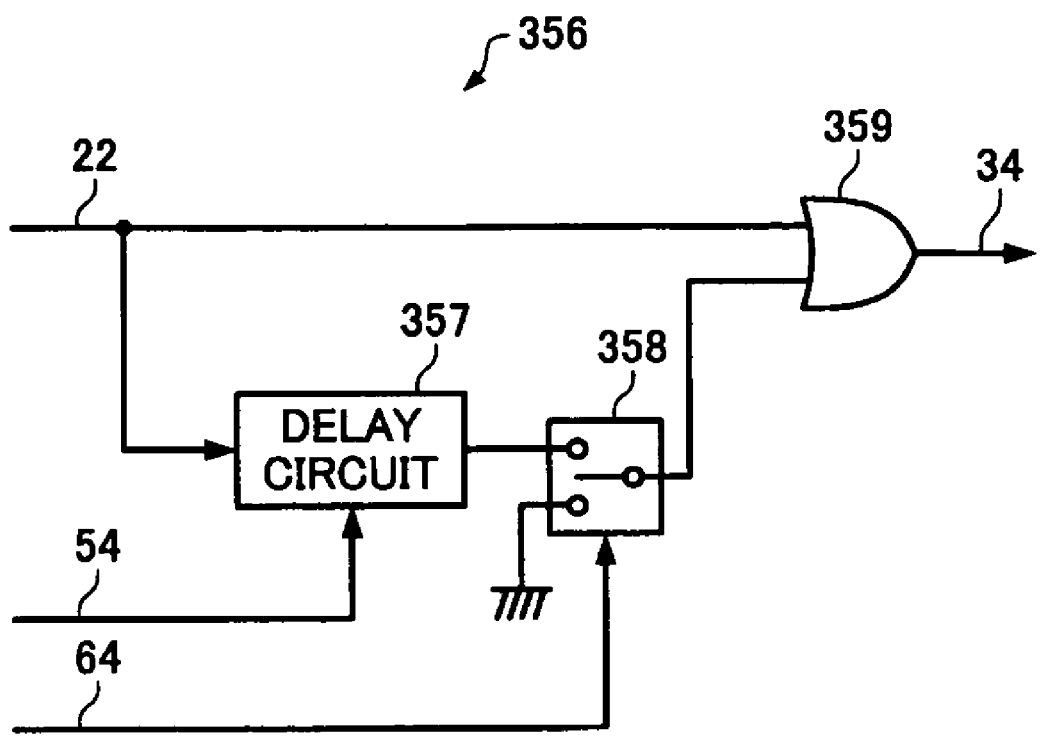
FIG. 10 is a diagram illustrating an example of the configuration of a duty ratio change circuit.

As illustrated in FIG. 10, the duty ratio change circuit 356 may be implemented using a delay circuit 357, a switch circuit 358, and an OR circuit 359, for example. The switch circuit 358 selects a ground potential when the control signal 64 is set at the low potential, and selects a signal obtained by delaying the square-wave voltage signal 22 based on the duty ratio change amount 54 using the delay circuit 357 when the control signal 64 is set at the high potential. The OR circuit 359 calculates the logical OR of the square-wave voltage signal 22 and the signal output from the switch circuit 358 to generate the detection signal 34.

The duty ratio change circuit 356 functions as a timing change section according to this embodiment.

Since the phase difference between the detection signal 34 (duty ratio: 50%) and the leakage signal is 90° when the control signal 64 is set at the low potential (angular velocity detection mode (during normal operation)), the leakage signal is canceled so that the angular velocity signal 32 has a voltage value corresponding to the magnitude of the angular velocity.

Since the duty ratio of the detection signal 34 is not 50% when the control signal 64 is set at the high potential (abnormality diagnosis mode), the angular velocity signal 32 has a voltage value obtained by superimposing the voltage value corresponding to the level of the leakage signal on the voltage value corresponding to the magnitude of the angular velocity. When setting the angular velocity detection apparatus 1 to the abnormality diagnosis mode in a state in which an angular velocity is not applied to the angular velocity detection apparatus 1 (e.g., when the angular velocity detection apparatus 1 stands still) (i.e., when the angular velocity is zero), the angular velocity signal 32 has a voltage value corresponding to the level of the leakage signal.

The operation of the angular velocity detection apparatus 1 according to the second embodiment in the abnormality diagnosis mode is described in detail below using examples of signal waveforms at the points Z and A to H illustrated in FIG. 9. The signal waveforms in the angular velocity detection mode (during normal operation) are the same as the signal waveforms illustrated in FIGS. 6 and 7. Therefore, description thereof is omitted.

Figure 11:
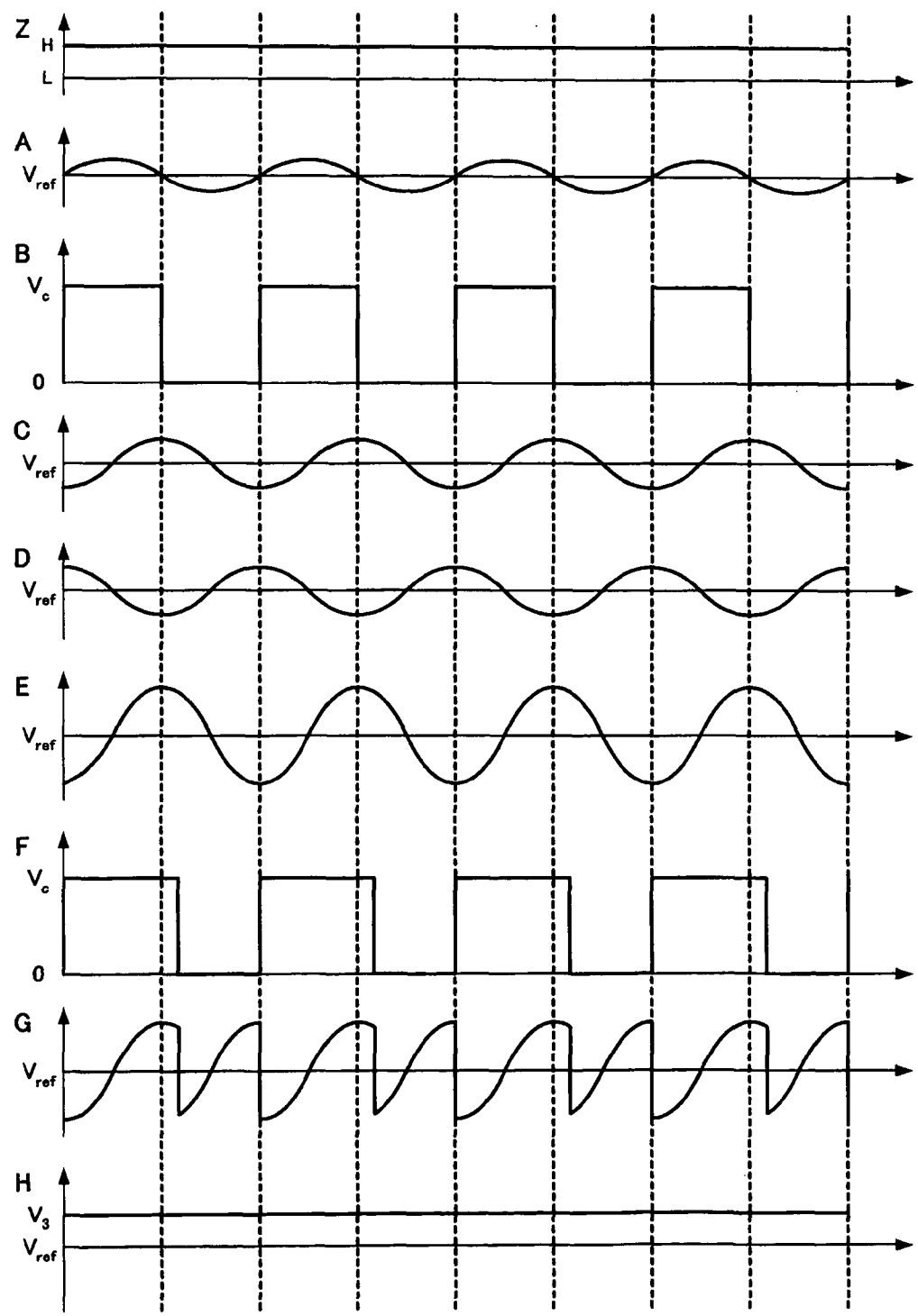
FIG. 11 is a diagram illustrating signal waveform examples according to the second embodiment of the invention in an abnormality diagnosis mode.

FIG. 11 is a diagram illustrating signal waveform examples in the abnormality diagnosis mode. In FIG. 11, the horizontal axis indicates time, and the vertical axis indicates voltage. FIG. 11 shows a case where the angular velocity detection apparatus 1 stands still.

In the abnormality diagnosis mode, the control signal 64 (signal at the point Z) is fixed at the high potential (see FIG. 11). The signal waveforms at the points A, B, C, D, and E are the same as those illustrated in FIG. 8. Therefore, description thereof is omitted.

When the control signal 64 (signal at the point Z) is fixed at the high potential, the detection signal 34 (signal output from the duty ratio change circuit 356 (signal at the point F)) is a square-wave voltage signal at a duty ratio (other than 50%) corresponding to the duty ratio change amount 54. Note that the term "duty ratio" used herein refers to a value obtained by dividing the pulse width of the square wave by the cycle, and multiplying the resulting value by 100(%). Therefore, the signal output from the synchronous detection circuit 350 (signal at the point G) is characterized in that the integral quantity of the voltage that is higher than the reference voltage $V_{ref}$ is not equal to the integral quantity of the voltage that is lower than the reference voltage $V_{ref}$. The difference in integral quantity changes depending on the signal level. Accordingly, a direct voltage signal (i.e., angular velocity signal 32) that has a voltage value $V_3$ corresponding to the level of the leakage signal and the duty ratio change amount 54 is generated at the output (point H) of the filter circuit 380.

The angular velocity detection apparatus 1 according to the second embodiment is thus configured so that the duty ratio change circuit 356 changes the relative timings of the rising edge and the falling edge of the detection signal 34 with respect to the signal (detection target signal 36) output from the AC amplifier circuit 340 based on whether the control signal 64 is set at the low potential (angular velocity detection mode (during normal operation)) or the high potential (abnormality diagnosis mode). Therefore, the angular velocity signal 32 has a voltage value corresponding to the magnitude of the angular velocity in the angular velocity detection mode (during normal operation) since the leakage signal is canceled, and has a voltage value corresponding to the level of the leakage signal in the abnormality diagnosis mode.

Accordingly, the angular velocity detection apparatus 1 according to the second embodiment allows a circuit abnormality and an element abnormality to be easily determined from the outside based on the voltage value of the angular velocity signal 32 in the abnormality diagnosis mode.

In the angular velocity detection apparatus 1 according to the second embodiment, the vibration state of the gyro sensor element 100 is identical in the abnormality diagnosis mode and the angular velocity detection mode (during normal operation) in the same manner as in the first embodiment. Therefore, the angular velocity detection apparatus 1 according to the second embodiment allows an abnormality that occurs in the angular velocity detection mode (during normal operation) to be reliably detected in the abnormality diagnosis mode, so that an abnormality can be diagnosed with improved reliability.

Third Embodiment

Figure 12:
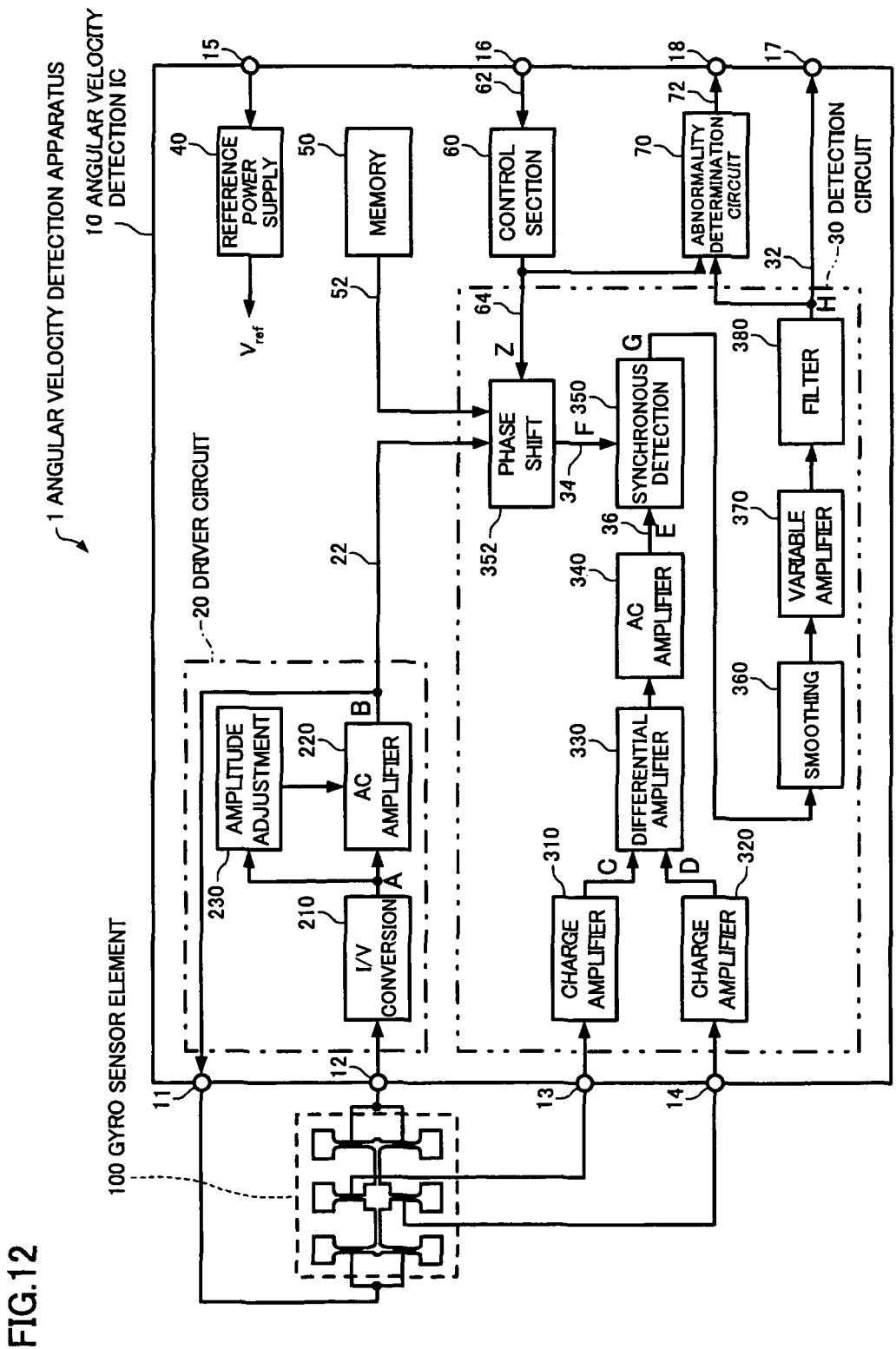
FIG. 12 is a diagram illustrating the configuration of an angular velocity detection apparatus according to the third embodiment of the invention.

FIG. 12 is a diagram illustrating the configuration of an angular velocity detection apparatus according to a third embodiment of the invention. In FIG. 12, the same sections as those illustrated in FIG. 1 are indicated by the same symbols. Description of these sections is omitted or simplified.

The third embodiment differs from the first embodiment in that an abnormality determination circuit 70 is additionally provided.

The abnormality determination circuit 70 generates an abnormality determination signal 72 that is set at a first potential (e.g., low potential) when the control signal 64 is set at the low potential (angular velocity detection mode (during normal operation)). The abnormality determination circuit 70 determines whether or not the voltage value of the angular velocity signal 32 is within the normal range when the control signal 64 is set at the high potential (abnormality diagnosis mode). The abnormality determination circuit 70 generates the abnormality determination signal 72 that is set at the first potential when the voltage value of the angular velocity signal 32 is within the normal range, and generates the abnormality determination signal 72 that is set at a second potential (e.g., high potential) when the voltage value of the angular velocity signal 32 is not within the normal range. The abnormality determination signal 72 is output to the outside via an external output terminal 18.

The abnormality determination circuit 70 functions as an abnormality determination section according to this embodiment.

In the configuration illustrated in FIG. 12, the abnormality determination circuit 70 is added to the configuration according to the first embodiment illustrated in FIG. 1. Note that the abnormality determination circuit 70 may also be added to the configuration according to the second embodiment illustrated in FIG. 9.

The angular velocity detection apparatus 1 according to the third embodiment allows the presence or absence of an abnormality (including an element abnormality) of the angular velocity detection apparatus 1 to be directly determined from the outside by setting the angular velocity detection apparatus 1 to the abnormality diagnosis mode in a state in which the angular velocity detection apparatus 1 stands still, and monitoring the abnormality determination signal 72. This makes it possible to reduce the load imposed on the external device as compared with the case of determining the presence or absence of an abnormality of the angular velocity detection apparatus 1 based on the voltage value of the angular velocity signal 32.

2. Abnormality Diagnosis System and Abnormal Diagnosis Method for Physical Quantity Detection Apparatus The following embodiments are described taking an example of an abnormality diagnosis system and an abnormality diagnosis method for a physical quantity detection apparatus (angular velocity detection apparatus) that detects an angular velocity as a physical quantity. Note that the following embodiments may be applied to an abnormality diagnosis system and an abnormality diagnosis method for an apparatus that detects an arbitrary physical quantity (e.g., angular velocity, acceleration, terrestrial magnetism, or pressure).

Fourth Embodiment

Figure 13:
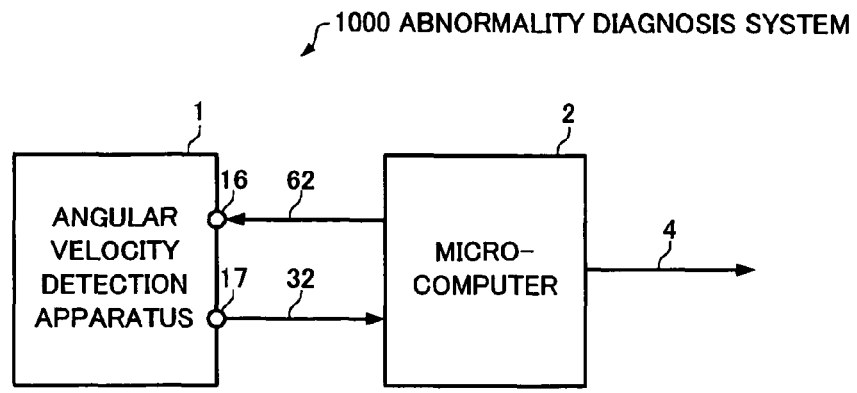
FIG. 13 is a diagram illustrating the configuration of an abnormality diagnosis system according to the fourth embodiment of the invention.

FIG. 13 is a diagram illustrating an example of the configuration of an abnormality diagnosis system for an angular velocity detection apparatus according to a fourth embodiment of the invention.

As illustrated in FIG. 13, an abnormality diagnosis 1000 according to the fourth embodiment includes an angular velocity detection apparatus 1 and a microcomputer 2.

The angular velocity detection apparatus 1 may be the angular velocity detection apparatus according to the first embodiment illustrated in FIG. 1 or the angular velocity detection apparatus according to the second embodiment illustrated in FIG. 9, for example.

The microcomputer 2 supplies the abnormality diagnosis mode setting signal 62 to the external input terminal 16 of the angular velocity detection apparatus 1, determines the presence or absence of an abnormality based on the angular velocity signal 32 output via the external input terminal 17, and outputs an abnormality determination signal 4. Specifically, the microcomputer 2 functions as an abnormality diagnosis apparatus according to this embodiment. The abnormality determination signal 4 is input to a display device (not illustrated), for example. An alarm is displayed when the angular velocity detection apparatus 1 is abnormal.

The microcomputer 2 may perform given calculations based on the angular velocity signal 32 when the microcomputer 2 does not perform abnormality diagnosis. For example, the microcomputer 2 may calculate the angle of a moving object in which the angular velocity detection apparatus 1 is installed, by integrating the voltage value of the angular velocity signal 32, and may calculate the current position based on the calculated angle and velocity information obtained from a velocity sensor (not illustrated).

Figure 14:
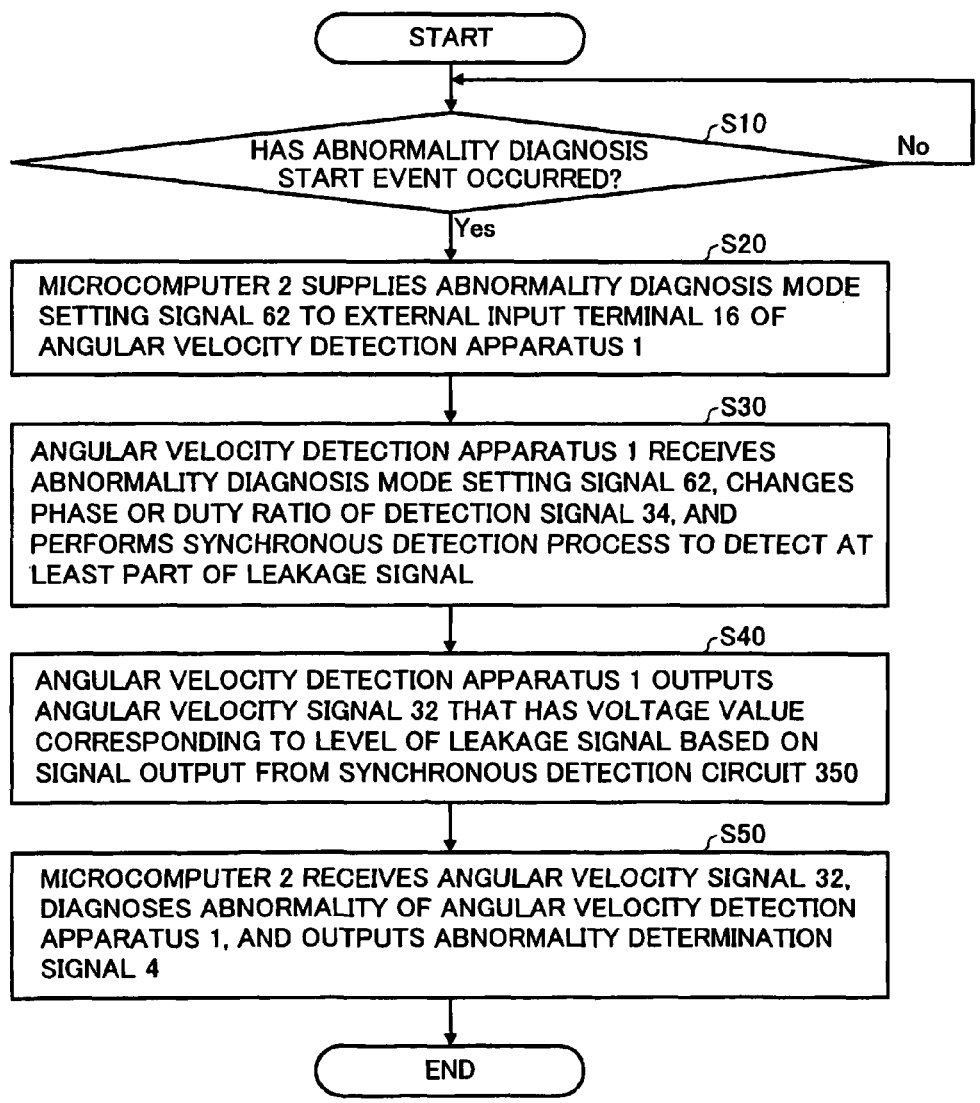
FIG. 14 is a flowchart illustrating an example of an abnormality diagnosis method according to the fourth embodiment of the invention.

FIG. 14 is a flowchart illustrating an example of abnormality diagnosis on the angular velocity detection apparatus using the abnormality diagnosis system 1000 illustrated in FIG. 13.

As illustrated in FIG. 14, when an abnormality diagnosis start event has occurred (Yes in step S10), the microcomputer 2 supplies the abnormality diagnosis mode setting signal 62 to the external input terminal 16 of the angular velocity detection apparatus 1 (step 20). The abnormality diagnosis start event may occur in a state in which an angular velocity is not applied to the angular velocity detection apparatus 1 (e.g., when the angular velocity detection apparatus 1 stands still). For example, when the angular velocity detection apparatus 1 is installed in a car, the abnormality diagnosis start event may occur when starting the engine of the car.

When the angular velocity detection apparatus 1 has received the abnormality diagnosis mode setting signal 62, the angular velocity detection apparatus 1 changes the phase or the duty ratio of the detection signal 34 using the phase shift circuit 352 or the duty ratio change circuit 356, and performs the synchronous detection process to detect at least part of the leakage signal (step 30).

The angular velocity detection apparatus 1 outputs the angular velocity signal 32 that has a voltage value corresponding to the level of the leakage signal based on the signal output from the synchronous detection circuit 350 (step S40).

The microcomputer 2 that has received the angular velocity signal 32 diagnoses an abnormality of the angular velocity detection apparatus 1, and outputs the abnormality determination signal 4 (step S50). For example, the microcomputer 2 determines whether or not the voltage value of the angular velocity signal 32 is within the normal range. The microcomputer 2 generates the abnormality determination signal 4 that is set at a first potential (e.g., low potential) when the voltage value of the angular velocity signal 32 is within the normal range, and generates the abnormality determination signal 4 that is set at a second potential (e.g., high potential) when the voltage value of the angular velocity signal 32 is not within the normal range.

The abnormality diagnosis system 1000 according to the fourth embodiment that utilizes the angular velocity detection apparatus 1 according to the first embodiment or the second embodiment implements abnormality diagnosis with improved reliability.

Fifth Embodiment

Figure 15:
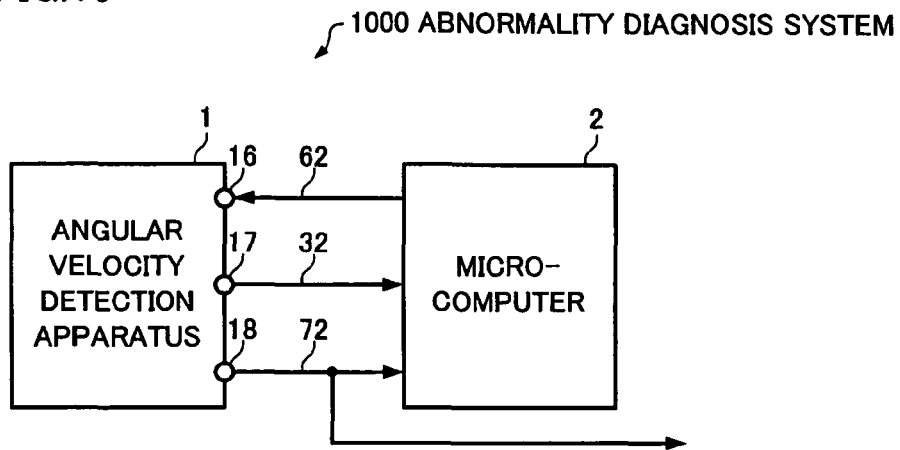
FIG. 15 is a diagram illustrating the configuration of an abnormality diagnosis system according to the fifth embodiment of the invention.

FIG. 15 is a diagram illustrating an example of the configuration of an abnormality diagnosis system for an angular velocity detection apparatus according to a fifth embodiment of the invention.

As illustrated in FIG. 15, an abnormality diagnosis system 1000 according to the fifth embodiment includes an angular velocity detection apparatus 1 and a microcomputer 2.

The angular velocity detection apparatus 1 may be the angular velocity detection apparatus according to the third embodiment illustrated in FIG. 12, for example.

The microcomputer 2 supplies the abnormality diagnosis mode setting signal 62 to the external input terminal 16 of the angular velocity detection apparatus 1. The angular velocity detection apparatus 1 receives the abnormality diagnosis mode setting signal 62, and outputs the abnormality determination signal 72 via the external output terminal 18. The abnormality determination signal 72 is input to a display device (not illustrated), for example. An alarm is displayed when the angular velocity detection apparatus 1 is abnormal.

The microcomputer 2 may receive the angular velocity signal 32 output from the angular velocity detection apparatus 1 via the external output terminal 17, and may perform given calculations. The microcomputer 2 may receive the abnormality determination signal 72, and may not perform calculations based on the angular velocity signal 32 when the angular velocity detection apparatus 1 is abnormal.

Figure 16:
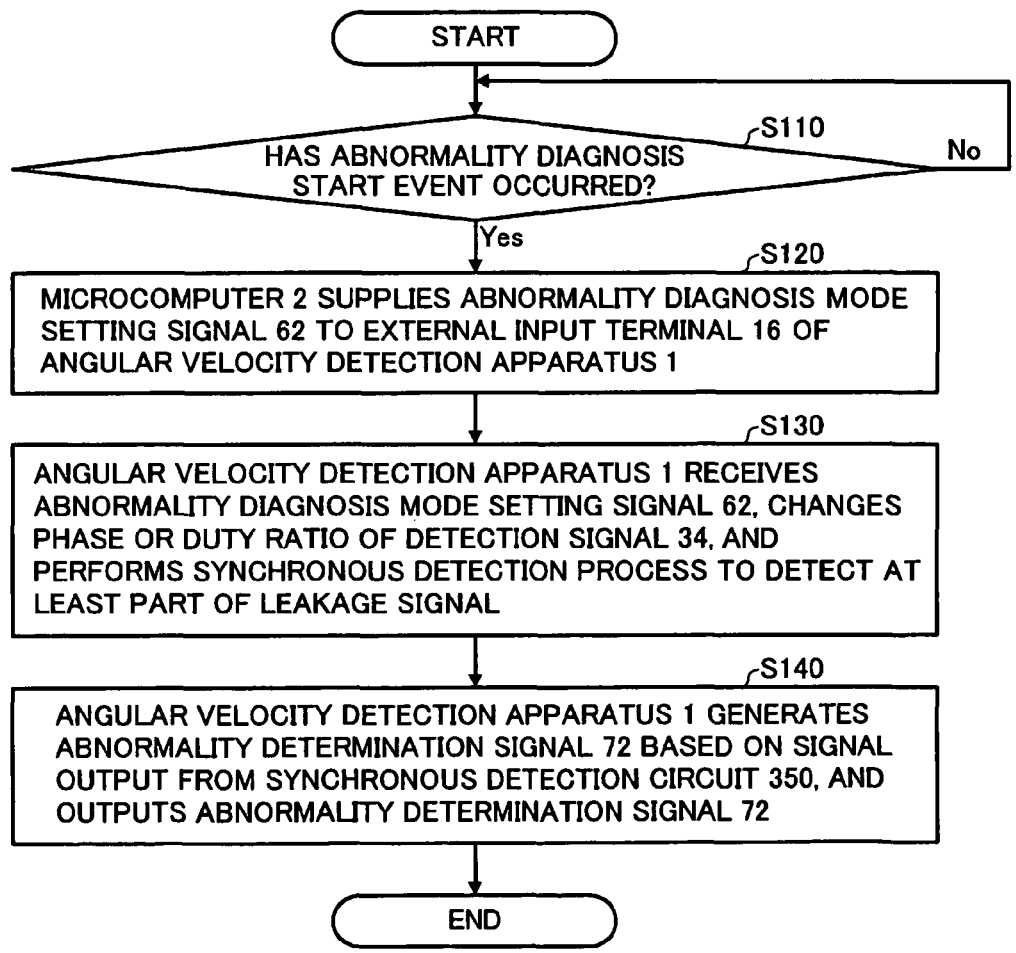
FIG. 16 is a flowchart illustrating an example of an abnormality diagnosis method according to the fifth embodiment of the invention.

FIG. 16 is a flowchart illustrating an example of abnormality diagnosis on the angular velocity detection apparatus using the abnormality diagnosis system 1000 illustrated in FIG. 15.

Steps S110, S120, and S130 illustrated in FIG. 16 are the same as the steps S10, S20, and S30 illustrated in FIG. 14. Therefore, description thereof is omitted.

The angular velocity detection apparatus 1 performs the synchronous detection process to detect at least part of the leakage signal (steps S110, S120, and S130).

The angular velocity detection apparatus 1 generates the abnormality determination signal 72 based on the signal output from the synchronous detection circuit 350, and outputs the abnormality determination signal 72 via the external output terminal 18.

The abnormality diagnosis system 1000 according to the fifth embodiment that utilizes the angular velocity detection apparatus 1 according to the third embodiment implements abnormality diagnosis with improved reliability. Since the microcomputer 2 can directly determine the presence or absence of an abnormality of the angular velocity detection apparatus 1 based on the abnormality determination signal 72, the load imposed on the microcomputer 2 can be reduced.

The invention is not limited to the above embodiments. Various modifications and variations may be made within the scope of the invention.

In the angular velocity detection apparatus 1 according to the first embodiment, the relative timings of the rising edge and the falling edge of the detection signal 34 with respect to the signal (detection target signal 36) output from the AC amplifier circuit 340 are changed by changing the phase of the detection signal 34 (see FIG. 1). Note that the relative timings of the rising edge and the falling edge of the detection signal 34 with respect to the signal (detection target signal 36) output from the AC amplifier circuit 340 may be changed by changing the phase of the signal output from the differential amplifier circuit 330 or the signal output from the AC amplifier circuit 340, for example.

In the angular velocity detection apparatus 1 according to the second embodiment, the relative timing of the falling edge of the detection signal 34 with respect to the signal (detection target signal 36) output from the AC amplifier circuit 340 is changed by changing the duty ratio of the detection signal 34 (see FIG. 9). Note that the relative timing of the rising edge of the detection signal 34 may be changed.

In the angular velocity detection apparatuses 1 according to the first to third embodiments, the relative timing of at least one of the rising edge and the falling edge of the detection signal 34 with respect to the signal (detection target signal 36) output from the AC amplifier circuit 340 may be changed by connecting the phase shift circuit 352 and the duty ratio change circuit 356 in series, and changing the phase and the duty ratio of the detection signal 34.

In the angular velocity detection apparatuses 1 according to the first to third embodiments, the AC amplifier circuit 220 outputs the square-wave voltage signal 22. Note that the AC amplifier circuit 220 may output a sine-wave voltage signal, for example. In this case, the synchronous detection circuit 350 may perform the synchronous detection process using a sine-wave detection signal 34.

The invention includes various other configurations substantially the same as the configurations described in connection with the embodiments (e.g., a configuration having the same function, method, and results, or a configuration having the same objective and effects). The invention also includes a configuration in which an unsubstantial section (part) described in connection with the embodiments is replaced by another section (part). The invention further includes a configuration having the same effects as those of the configurations described in connection with the embodiments, or a configuration capable of achieving the same objective as that of the configurations described in connection with the embodiments. Further, the invention includes a configuration in which a known technique is added to the configurations described in connection with the embodiments.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A physical quantity detection apparatus that detects a given physical quantity, the physical quantity detection apparatus comprising:
   a physical quantity detection element that includes a drive electrode and a detection electrode, and vibrates based on a drive signal supplied to the drive electrode so that a physical quantity detection signal that corresponds to thea magnitude of the physical quantity and a leakage signal of vibrations based on the drive signal flow through the detection electrode;
   a driver section that generates the drive signal;
   a synchronous detection section that performs a synchronous detection process on a detection target signal that includes the physical quantity detection signal and the leakage signal based on a detection signal that is synchronized with the drive signal; and
   a timing change section that changes a relative timing of at least one of a rising edge and a falling edge of the detection signal with respect to the detection target signal based on a control signal so that at least part of the leakage signal is output by the synchronous detection process.

2. The physical quantity detection apparatus as defined in claim 1,
   the timing change section changing a phase difference between the detection signal and the detection target signal based on the control signal.

3. The physical quantity detection apparatus as defined in claim 1,
   the timing change section changing a duty ratio of the detection signal based on the control signal.

4. The physical quantity detection apparatus as defined in claim 1,
   a change amount of the relative timing being adjustable by the timing change section.

5. The physical quantity detection apparatus as defined in claim 1, further comprising:
   an abnormality determination section that determines presence or absence of an abnormality of the physical quantity detection apparatus based on a signal output from the synchronous detection section.

6. The physical quantity detection apparatus as defined in claim 1,
   the physical quantity being an angular velocity.

7. An abnormality diagnosis system for a physical quantity detection apparatus, the abnormality diagnosis system comprising:
   the physical quantity detection apparatus as defined in claim 1; and
   an abnormality diagnosis apparatus that supplies the control signal to the physical quantity detection apparatus, receives a signal that is generated by the physical quantity detection apparatus based on a signal output from the synchronous detection section, and diagnoses an abnormality of the physical quantity detection apparatus based on the received signal.

8. A method of controlling a physical quantity detection apparatus that includes a physical quantity detection element that includes a drive electrode and a detection electrode, and vibrates based on a drive signal supplied to the drive electrode so that a physical quantity detection signal that corresponds to a magnitude of a given physical quantity and a leakage signal of vibrations based on the drive signal flow through the detection electrode, a driver section that generates the drive signal, and a synchronous detection section that performs a synchronous detection process on a detection target signal that includes the physical quantity detection signal and the leakage signal based on a detection signal that is synchronized with the drive signal, the method comprising:
   causing the physical quantity detection apparatus to change a relative timing of at least one of a rising edge and a falling edge of the detection signal with respect to the detection target signal and to perform the synchronous detection process so that at least part of the leakage signal is output from the synchronous detection section; and
   causing the physical quantity detection apparatus to generate a signal that corresponds to the leakage signal based on a signal output from the synchronous detection section.

9. A method of controlling a physical quantity detection apparatus that includes a physical quantity detection element that includes a drive electrode and a detection electrode, and vibrates based on a drive signal supplied to the drive electrode so that a physical quantity detection signal that corresponds to a magnitude of a given physical quantity and a leakage signal of vibrations based on the drive signal flow through the detection electrode, a driver section that generates the drive signal, and a synchronous detection section that performs a synchronous detection process on a detection target signal that includes the physical quantity detection signal and the leakage signal based on a detection signal that is synchronized with the drive signal, the method comprising:

causing the physical quantity detection apparatus to change a relative timing of at least one of a rising edge and a falling edge of the detection signal with respect to the detection target signal and to perform the synchronous detection process so that at least part of the leakage signal is output from the synchronous detection section; and causing the physical quantity detection apparatus to determine presence or absence of an abnormality of the physical quantity detection apparatus based on a signal output from the synchronous detection section.

10. The physical quantity detection apparatus as defined in claim 1, the timing change section changing the relative timing based on whether a detection mode is set or an abnormality diagnosis mode is set, so that at least part of the leakage signal is output by the synchronous detection process in the abnormality diagnosis mode.

11. The method as defined in claim 8, the causing of the physical quantity detection apparatus to change the relative timing based on whether a detection mode is set or an abnormality diagnosis mode is set, so that at least part of the leakage signal is output in the abnormality diagnosis mode.

12. The method as defined in claim 9, the causing of the physical quantity detection apparatus to change the relative timing based on whether a detection mode is set or an abnormality diagnosis mode is set, so that at least part of the leakage signal is output in the abnormality diagnosis mode.

* * * * *